(12) United States Patent
Hamanaka

(10) Patent No.: US 7,715,619 B2
(45) Date of Patent: May 11, 2010

(54) IMAGE COLLATION SYSTEM AND IMAGE COLLATION METHOD

(75) Inventor: Masahiko Hamanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 290 days.

(21) Appl. No.: 10/576,498

(22) PCT Filed: Oct. 21, 2004

(86) PCT No.: PCT/JP2004/015612

§ 371 (c)(1),
(2), (4) Date: Apr. 20, 2006

(87) PCT Pub. No.: WO2005/038716

PCT Pub. Date: Apr. 28, 2005

(65) Prior Publication Data

US 2007/0031001 A1    Feb. 8, 2007

(30) Foreign Application Priority Data

Oct. 21, 2003    (JP)    ............... 2003-360713

(51) Int. Cl.
*G06K 9/00*    (2006.01)
(52) U.S. Cl. ............... 382/154; 382/115; 382/118
(58) Field of Classification Search ............... 382/154, 382/209, 115, 118
See application file for complete search history.

(56) References Cited

U.S. PATENT DOCUMENTS

| 6,002,782 | A  | * | 12/1999 | Dionysian | ............... | 382/118 |
| 6,956,569 | B1 | * | 10/2005 | Roy et al. | ............... | 345/426 |
| 7,218,773 | B2 | * | 5/2007  | Ishiyama | ............... | 382/154 |
| 7,227,973 | B2 | * | 6/2007  | Ishiyama | ............... | 382/103 |

| 2001/0020946 | A1 | * | 9/2001 | Kawakami et al. | ............... | 345/582 |

FOREIGN PATENT DOCUMENTS

EP    1 139 269 A2    10/2001

(Continued)

OTHER PUBLICATIONS

Office Action issued by the Chinese Patent Office on Jul. 25, 2008, with English language translation, pp. 1 to.

*Primary Examiner*—John B Strege
*Assistant Examiner*—Eric Rush
(74) *Attorney, Agent, or Firm*—Whitham Curtis Christofferson & Cook, PC

(57) ABSTRACT

There are provided a three-dimensional data input means (10) for input the three-dimensional data of an object, a reference image storing unit (30) for storing a reference image of at least one object, a pose candidate deciding means (20) for generating a pose candidate that is a candidate for the pose of the object, a comparison image generating means (40) for generating a comparison image close to the reference image while projecting the three-dimensional data onto a two-dimensional image in accordance with the pose candidate, and an image comparing means (55) for performing comparison based on either a distance value or similarity degree between the reference image and the comparison image. This allows comparison or search to be performed with high accuracy even when the reference image of the object is captured under different conditions such as pose and illumination, even when no three-dimensional object model of the object can be obtained in advance, or even when only one or few reference images exist.

26 Claims, 16 Drawing Sheets

FOREIGN PATENT DOCUMENTS

| | | | |
|---|---|---|---|
| JP | 10-232934 A | | 9/1998 |
| JP | 10232934 A | * | 9/1998 |
| JP | 11-238135 A | | 8/1999 |
| JP | 2000-306106 A | | 11/2000 |
| JP | 2000-322577 A | | 11/2000 |
| JP | 2001-134765 A | | 5/2001 |
| JP | 2001-222716 A | | 8/2001 |
| JP | 2001222716 A | * | 8/2001 |
| JP | 2002-024830 A | | 1/2002 |
| JP | 2003-068896 A | | 2/2003 |

* cited by examiner

IMAGE COLLATION SYSTEM AND IMAGE COLLATION METHOD

TECHNICAL FIELD

The present invention relates to an image comparison system, image comparison method, and image comparison program and, more particularly, to an image comparison system, image comparison method, and image comparison program capable of comparison and search at high accuracy even when no three-dimensional model of an object can be registered beforehand, only one or few reference images of each object exist in a database of the system or on a network, and these reference images are captured under different conditions such as pose and illumination.

BACKGROUND ART

FIG. 25 is a block diagram showing a conventional image comparison system. This conventional image comparison system comprises an image input means 115, image converting means 117, image comparing means 157, reference image storing unit 130, and standard three-dimensional object model storing unit 135.

Reference images obtained by sensing the images of objects are prestored in the reference image storing unit 130. Standard three-dimensional object models are prestored in the standard three-dimensional object model storing unit 135. The image converting means 117 generates a partial image by converting one or both of an input image from the image input means 115 and each reference image obtained from the reference image storing unit 130 such that the pose conditions are the same, in relation to a partial image common to the input image and reference image, by using a three-dimensional object model obtained from the standard three-dimensional object model storing unit 135.

A partial region is a characteristic portion such as an eye, nose, or mouth. Partial regions can be related to each other by designating feature points in images and three-dimensional object models beforehand. The image comparing means 157 compares the partial images of the input image and each reference image converted by the image converting means 117, calculates average similarity degrees, and selects a reference image having the largest similarity degree for each object (e.g., Japanese Patent Laid-Open No. 2000-322577 (patent reference 1)).

FIG. 26 is a block diagram showing another conventional image comparison system. This conventional image comparison system comprises an image input means 115, illumination change correcting means 122, image converting means 118, image comparing means 158, reference image storing unit 130, and standard three-dimensional object model storing unit 135.

Reference images obtained by sending the images of objects are prestored in the reference image storing unit 130. Standard three-dimensional object models are prestored in the standard three-dimensional object model storing unit 135. The illumination change correcting means 122 estimates the illumination condition (surface reflectance) of an input image from the image input means 115, by using a three-dimensional object model obtained from the standard three-dimensional object model storing unit 135. The image converting means 118 generates an image by converting the input image by using a three-dimensional object model so as to meet the illumination condition of a reference image. The image comparing means 158 compares the input image converted by the image converting means 118 with individual reference images, calculates similarity degrees, and selects a reference image having the largest similarity degree for each object (e.g., Japanese Patent Laid-Open No. 2002-024830 (patent reference 2)).

FIG. 27 is a block diagram showing still another conventional image comparison system. This conventional image comparison system comprises an image input means 115, reference three-dimensional object model storing unit 137, and pose estimating/comparing means 150. The pose estimating/comparing means 150 includes a pose candidate deciding means 120, comparison image generating means 140, and image comparing means 155.

Reference three-dimensional object models generated by measuring objects are prestored in the reference three-dimensional object model storing unit 137. The pose estimating/comparing means 150 calculates a minimum distance value (or a maximum similarity degree) between an input image obtained from the image input means 115 and each reference three-dimensional object model obtained from the reference three-dimensional object model storing unit 137, and selects a model having the smallest minimum distance value.

More specifically, the pose candidate deciding means 120 generates at least one pose candidate. Then, the comparison image generating means 140 generates a comparison image close to an input image while projecting a reference three-dimensional object model onto a two-dimensional image in accordance with the pose candidate. The image comparing means 155 calculates a distance value between the comparison image and the input image, and selects a comparison image having the smallest distance value for each model, thereby estimating an optimum pose and obtaining a minimum distance value between the input image and the reference three-dimensional object model. In addition, the image comparing means 155 selects a model having the smallest minimum distance value (e.g., Japanese Patent Laid-Open No. 2003-058896 (patent reference 3)).

DISCLOSURE OF INVENTION

Problems to be Solved by the Invention

The image comparison systems of patent references 1 and 2 cannot perform comparison at sufficiently high accuracy if the poses or illumination conditions of an input image and reference image are different.

The reasons are as follows. In patent reference 1, image conversion is performed by matching the pose conditions by estimating the pose of each image. However, it is difficult to accurately estimate the pose of an image, so images cannot be correctly matched. In addition, image conversion is performed using a standard three-dimensional object model different from the three-dimensional shape of an object to be observed. Therefore, distortion by image conversion increases if the shape is complicated or the pose conditions are largely different.

In patent reference 2, image conversion is performed by estimating the illumination conditions by using a standard three-dimensional object model different from the three-dimensional shape of an object to be observed. Accordingly, a correction error sometimes occurs in a fine portion although the correction is roughly accurate.

Furthermore, the system of patent reference 3 cannot perform comparison if no three-dimensional object model of each object is registered beforehand or the number of reference images is small.

The reasons are as follows. In the technique of patent reference 3, three-dimensional object models are registered in advance and compared with an input image. Also, to register three-dimensional object models in advance, each object must be measured by a three-dimensional shape measurement device before comparison. However, this measurement is difficult to perform in many cases. It is also possible to generate a three-dimensional object model from a plurality of images, but the generation of a three-dimensional object model is difficult if the number of reference images is small.

Means for Solving the Problems

The present invention has been made in consideration of the above situation, and has as its object to make high-accuracy comparison and search possible even when reference images of objects are captured under different conditions such as pose and illumination.

It is another object of the present invention to make high-accuracy comparison and search possible even when no three-dimensional object model of each object can be obtained beforehand.

It is still another object of the present invention to make high-accuracy comparison and search possible even when each object has only one or few reference images.

To achieve the above objects, an image comparison system according to the present invention is characterized by comprising input means for input three-dimensional data of an object, reference image storing means for storing a reference image of at least one object, pose candidate generating means for generating a pose candidate as a candidate for pose of the object, comparison image generating means for generating a comparison image close to the reference image while projecting the three-dimensional data onto a two-dimensional image in accordance with the pose candidate, and image comparing means for performing comparison on the basis of one of a distance value and a similarity degree between the reference image and the comparison image.

An image comparison method according to the present invention is characterized by comprising the steps of input three-dimensional data of an object, generating a pose candidate as a candidate for pose of the object, generating a comparison image close to a reference image while projecting the three-dimensional data onto a two-dimensional image in accordance with the pose candidate, and performing comparison on the basis of one of a distance value and a similarity degree between the reference image and the comparison image.

An image comparison program according to the present invention is characterized by causing a computer to execute a procedure of input three-dimensional data of an object, a procedure of generating a pose candidate as a candidate for pose of the object, a procedure of generating a comparison image close to a reference image while projecting the three-dimensional data onto a two-dimensional image in accordance with the pose candidate, and a procedure of performing comparison on the basis of one of a distance value and a similarity degree between the reference image and the comparison image.

EFFECTS OF THE INVENTION

The first effect of the present invention is that comparison and search can be performed at high accuracy even when reference images of each object are captured under different conditions such as pose and illumination. This is so because three-dimensional data of an object is measured, a comparison image matching the image sensing conditions such as the pose and illumination of each reference image is generated, and comparison is performed by comparing the comparison image with the reference image.

The second effect is that comparison and search can be performed at high accuracy even when no three-dimensional object model of each object can be obtained beforehand, or even when only one or few reference images exist. This is so because three-dimensional data of an object is measured, a comparison image matching the existing reference image is generated, and comparison is performed by comparing the comparison image with the reference image.

BEST MODE FOR CARRYING OUT THE INVENTION

Embodiments of the present invention will be described in detail below with reference to the accompanying drawings.

First Embodiment

Figure 1:
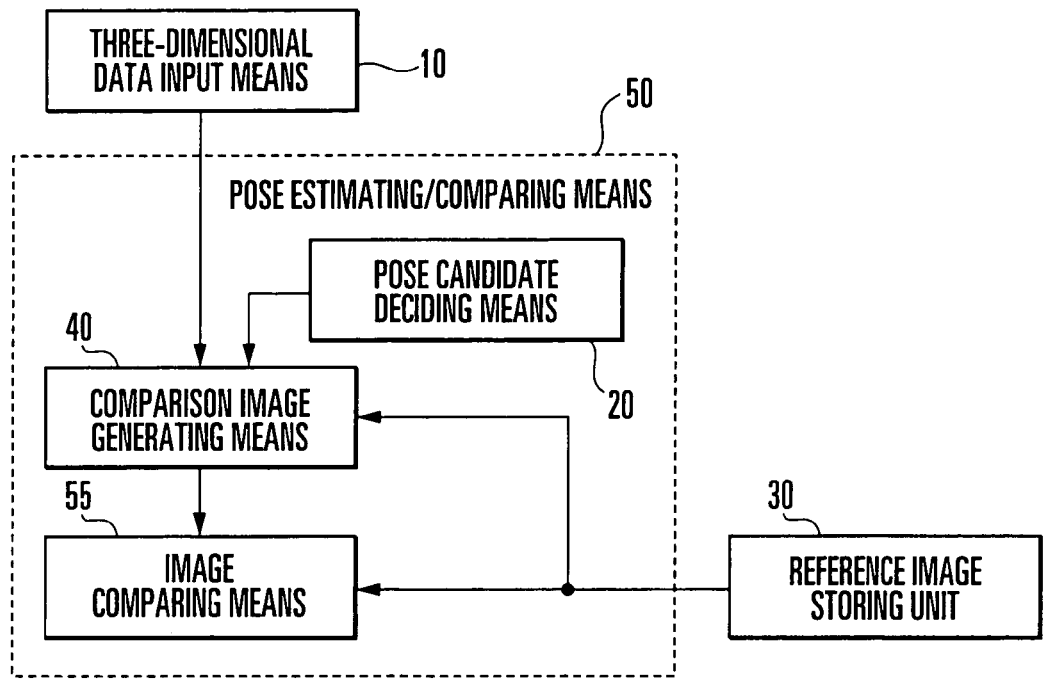
FIG. 1 is a block diagram showing the arrangement of the first embodiment of an image comparison system according to the present invention.

FIG. 1 is a block diagram showing the first embodiment of an image comparison system according to the present invention. In FIG. 1, reference numeral 10 denotes a three-dimensional data input means for input three-dimensional data; 30, a reference image storing unit; and 50, a pose estimating/comparing means. The pose estimating/comparing means 50 includes a pose candidate deciding means 20, comparison image generating means 40, and image comparing means 55.

Outlines of the operations of these means are as follows. First, a reference image obtained by sensing the image of at least one object is prestored in the reference image storing unit 30. The image sensing conditions such as the pose and illumination of the reference image are not limited. Also, the reference image storing unit 30 can be incorporated into the system or connected across a network to the system.

The three-dimensional data input means 10 inputs three-dimensional data of an object to be compared (or an object to be searched). Three-dimensional data can be generated by using, e.g., a three-dimensional shape measurement apparatus described in Japanese Patent Laid-Open No. 2001-12925, or an apparatus described in Japanese Patent Laid-Open No. 9-91436 which restores a three-dimensional shape from a plurality of images captured by a large number of cameras.

The pose estimating/comparing means 50 calculates a minimum distance value (or a maximum similarity degree) between the three-dimensional data input by the three-dimensional data input means 10 and the reference image obtained from the reference image storing unit 30. More specifically, the pose candidate deciding means 20 generates a pose candidate as a candidate for the pose of at least one object (the pose of an object is represented by the position and direction of the object). The comparison image generating means 40 generates a comparison image close to the reference image while projecting the three-dimensional data onto a two-dimensional image in accordance with the pose candidate.

Figure 2:
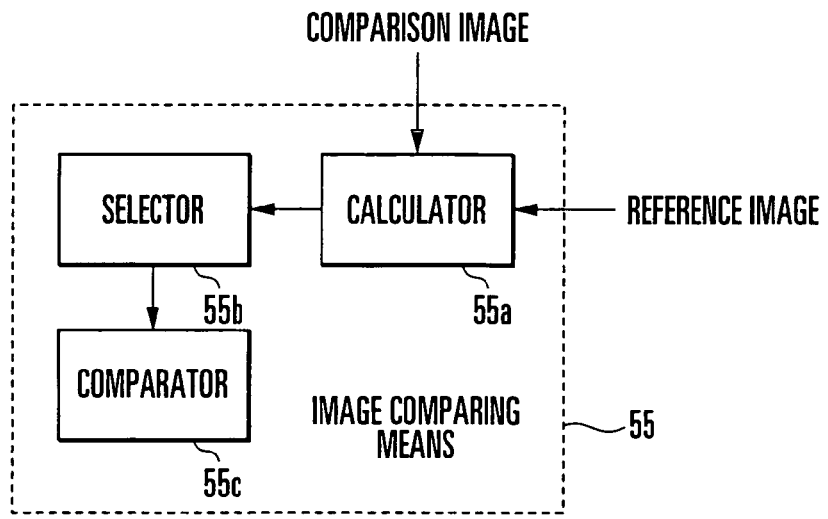
FIG. 2 is a block diagram showing the arrangement of an image comparing means of the first embodiment.

The image comparing means 55 includes a calculator 55$a$, selector 55$b$, and comparator 55$c$ shown in FIG. 2. The image comparing means 55 calculates a distance value between the comparison image and the reference image in the calculator 55$a$, and selects a comparison image having the smallest distance value with respect to the reference image in the selector 55$b$, thereby estimating an optimum pose and obtaining a minimum distance value between the three-dimensional data and the reference image. In addition, in comparison (1:1 comparison) with one object (reference image), the comparator 55$c$ compares the minimum distance value with a threshold value to determine whether the two objects are the same. That is, if the minimum distance value is equal to or smaller than the threshold value, the comparator 55$c$ determines that the two objects are the same; if not, the comparator 55$c$ determines that the two objects are different. Also, in a process (1:N comparison) of searching a plurality of objects for an object (reference image) closest to the input three-dimensional data, the comparator 55$c$ selects a reference image having the smallest minimum distance value. Note that when determination is to be performed by using a similarity degree between a comparison image and a reference image, it is determined that the two objects are the same if the similarity degree is equal to or larger than a threshold value, and it is determined that the two objects are different if not.

The overall operation of 1:1 comparison of this embodiment will be explained in detail below with reference to FIG. 1 and a flowchart in FIG. 3. In this explanation, comparison of input three-dimensional data with a reference image $R_k$ will be described.

Figure 3:
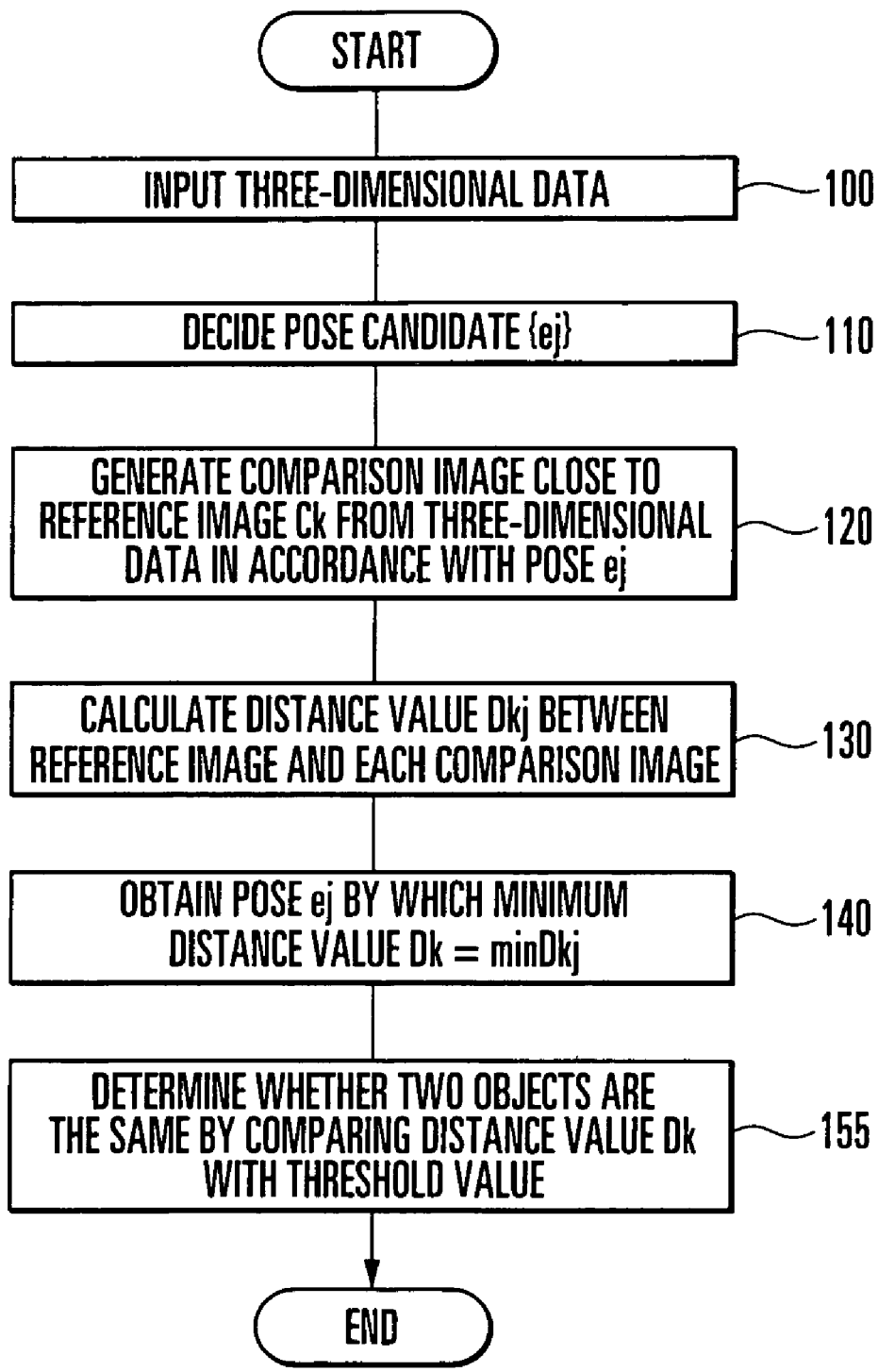
FIG. 3 is a flowchart showing the operation of 1:1 comparison in the first embodiment.

Referring to FIG. 3, the three-dimensional data input means 10 inputs three-dimensional data (step 100). Then, the pose candidate deciding means 20 decides a pose candidate group $\{e_j\}$ (step 110). The comparison image generating means 40 generates a comparison image close to the reference image $R_k$ while projecting the three-dimensional data onto a two-dimensional image in accordance with a pose candidate (step 120). The image comparing means 55 calculates a distance value between the comparison image and the reference image (step 130). Furthermore, the image comparing means 55 selects a comparison image having the smallest distance value, thereby estimating an optimum pose and obtaining a minimum distance value between the three-dimensional value and the reference image $R_k$ (step 140).

Although a pose candidate having the smallest distance value is selected from the predetermined pose candidate group in the above description, it is also possible to return to the pose candidate deciding means 20 to search for a pose candidate having the smallest distance value while sequentially changing pose candidates. Then, the pose estimating/comparing means 50 compares the minimum distance value with a threshold value to determine whether the two objects are the same (step 155).

Figure 4:
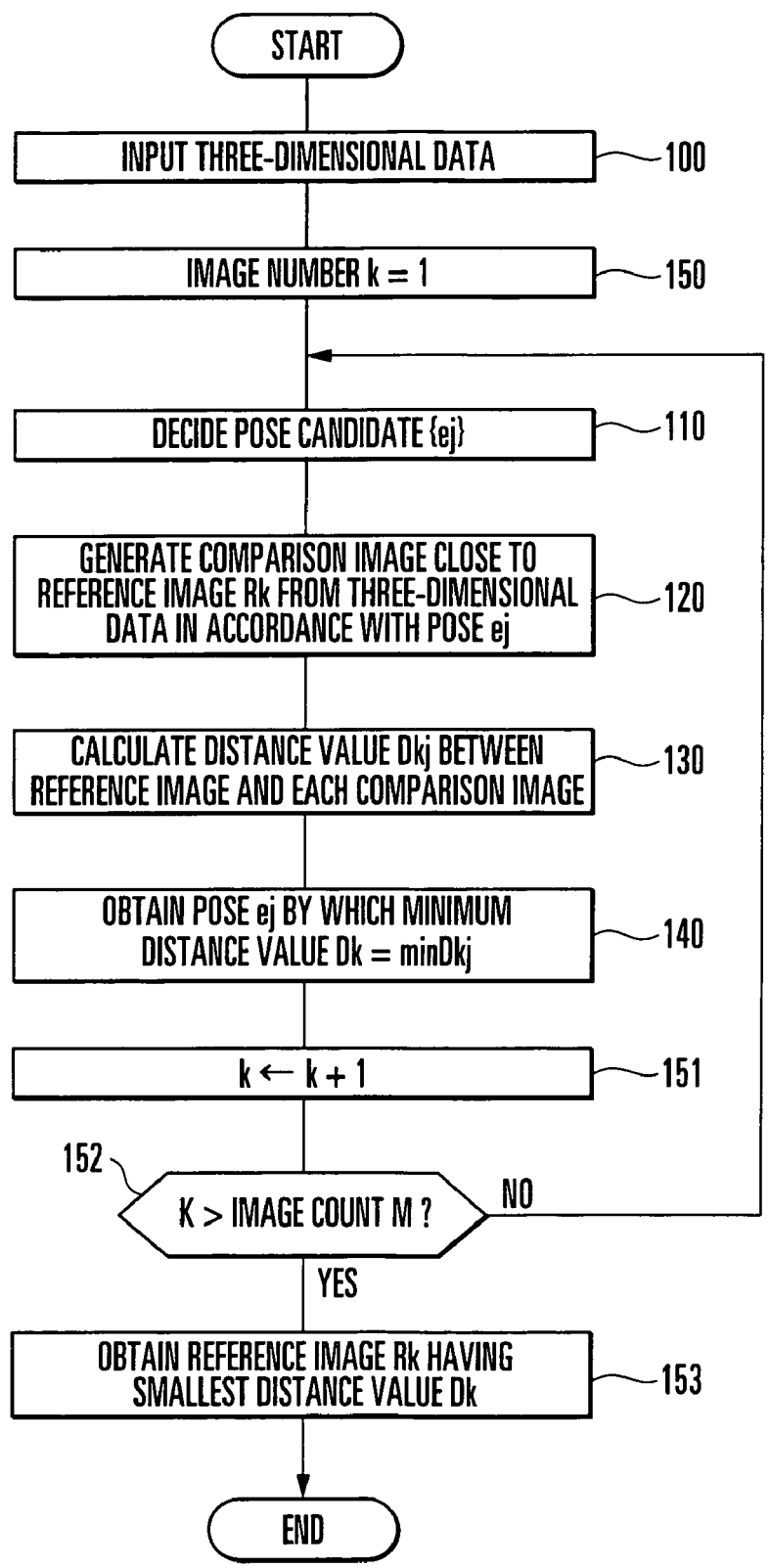
FIG. 4 is a flowchart showing the operation of 1:N comparison in the first embodiment.

The overall operation of 1:N comparison of this embodiment will be explained in detail below with reference to FIG. 1 and a flowchart in FIG. 4. Referring to FIG. 4, the three-dimensional data input means 10 inputs three-dimensional data (step 100). Then, the pose estimating/comparing means 50 initially sets the image number of a reference image to k=1 (step 150). After that, the same processes as in steps 110 to 140 of FIG. 3 are executed in steps 110 to 140.

Subsequently, the pose estimating/comparing means 50 increments the image number k by 1 (step 151), and compares the image number k with an image count M (the number of reference images) (step 152). If the image number k is equal to or smaller than the image count M, the flow returns to step 110 to perform the same processing, thereby calculating the minimum distance value of the next reference image. Finally, if the image number k is equal to or larger than the image count M in step 152, a reference image $R_k$ having the smallest minimum distance value is output as a comparison result (step 153).

Figure 5:
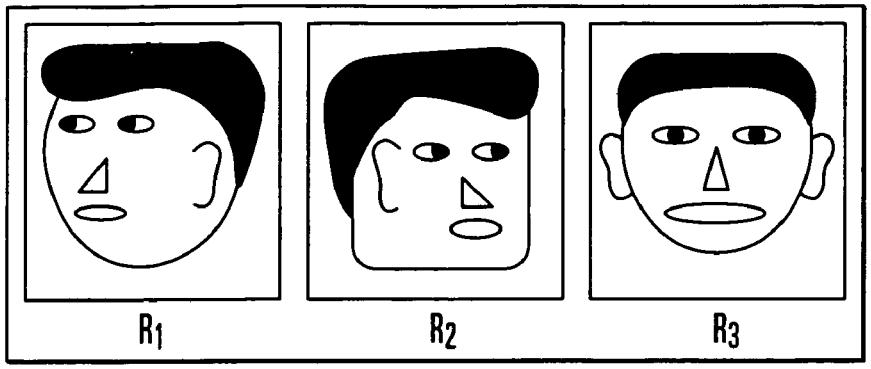
FIG. 5 is a view showing practical examples of reference images in the first embodiment.

The operation of this embodiment will be explained in more detail below by using a practical example. Although an explanation will be made by taking a person's face as an example of an object of comparison, the present invention is of course also applicable to comparison of another object. First, as shown in FIG. 5, reference images $R_k(r)$ (r is the index of a pixel or feature) of objects k are stored in the reference image storing unit 30. Note that the pose conditions of these images are not necessarily the same (differences between illumination conditions are not shown). Note also that one reference image is stored for each object in this example, but a plurality of reference images may also be stored for each object.

Figure 6:
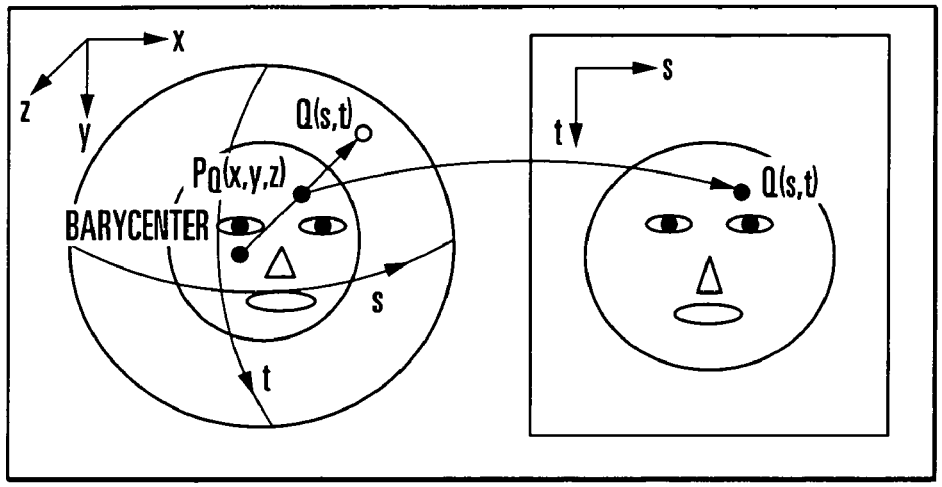
FIG. 6 is a view showing a practical example of three-dimensional data in the first embodiment.

The operation of 1:N comparison will be described below. First assume that three dimensional data as shown in FIG. 6 is input from the three-dimensional data input means 10 (step 100 in FIG. 4). As shown in FIG. 6, this three-dimensional data has a shape $P_Q(x,y,z)$ and texture $T_Q(R,G,B)$ in a three-dimensional space (x,y,z) on the object surface as information. Q represents the index of a point on the object surface, and corresponds to, e.g., the coordinates of a point Q(s,t) which is obtained by projecting a point on the object surface from the barycenter of the object onto a sphere having the barycenter of the object as its center. To increase the efficiency of comparison, CG images for learning are generated beforehand from three-dimensional data under various illumination conditions by computer graphics, and a base image group is obtained by analyzing the main components of these CG images for learning.

Then, the pose estimating/comparing means 50 initially sets the image number of a reference image to k=1 (step 150). The pose candidate deciding means 20 decides a pose candidate group $\{e_j\}$ (step 110). Although the pose candidate group can be preset regardless of a reference image, it is also possible to manually or automatically extract reference points such as an eye, nose, and mouth from a reference image and three-dimensional data, and estimate a rough pose by using a method of calculating the position and direction of an object described in Japanese Patent Laid-Open No. 2001-283229, thereby generating a pose candidate group around the estimated pose. A rough pose may also be estimated and stored in advance by comparing representative three-dimensional data (model) prepared beforehand with a reference image, without using any input three-dimensional data.

Figure 7:
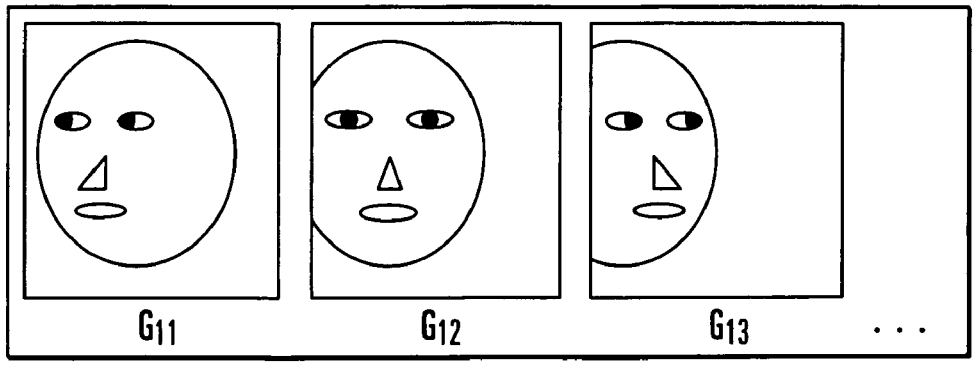
FIG. 7 is a view showing practical examples of comparison images in the first embodiment.

Then, the comparison image generating means 40 generates comparison images $G_{kj}(r)$ close to the illumination condition of the reference image $R_k$ while projecting the three-dimensional data onto a two-dimensional image in accordance with a pose candidate $e_j$ (step 120). These comparison images close to the illumination condition of the reference image can be generated by converting the coordinates of previously obtained base images on the basis of each pose candidate, and calculating the coefficient of the linear sum of the base images having the converted coordinates by the least square method such that the linear sum is close to the input image. FIG. 7 shows examples of comparison images generated for a reference image $R_1$ (no grayscale information is shown).

Subsequently, the image comparing means 55 calculates a distance value between the comparison image and the reference image (step 130). When a Euclid distance is used, for example, the distance value can be calculated by $$D_{kj}=\Sigma_r\{R_k(r)-G_{kj}(r)\}^2$$

When a similarity degree $S_{kj}$ is used, for example, the similarity degree $S_{kj}$ can be calculated by $$S_{kj}=\exp(-D_{kj})$$

In this case, the pose estimating/comparing means 50 estimates an optimum pose by selecting a comparison image having the smallest distance value, and also calculates a minimum distance value $D_k$ between the three-dimensional data and the reference image $R_k$ by minimum distance value $D_k=\min_j D_{kj}$ (step 140). In the case shown in FIG. 7, $G_{11}$, for example, is selected.

Then, the image number k is incremented by 1 (step 151), and the image number k is compared with the image count M (step 152). If the image number k is equal to or smaller than the image count M, the flow returns to step 110 to perform the same processing, thereby calculating the minimum distance value of the next reference image. Finally, if the image number k is equal to or larger than the image count M in step 152, a reference image $R_k$ having the smallest minimum distance value is output as a comparison result (step 153). In the case of the three-dimensional data shown in FIG. 6, if the minimum distance values for the reference images $R_k$ are calculated as {20, 50, 25}, for example, the reference image $R_1$ shown in FIG. 5 is selected as a reference image having the smallest minimum distance value.

Note that a distance value between a comparison image and a reference image is calculated in this embodiment, but a similarity degree may also be used instead of the distance value. As an example, the similarity degree can be calculated by the method as described above. When the similarity degree is used, a reference image having the largest maximum similarity degree is output as a comparison result.

This applies to all embodiments to be described below.

In this embodiment, three-dimensional data of an object is measured, and this three-dimensional data is compared and compared with a reference image while the pose and illumination condition are corrected. Therefore, comparison and search can be performed at high accuracy even when reference images of objects are captured under different conditions such as pose and illumination. Also, since three-dimensional data of an object is measured and this three-dimensional data is compared and compared with a reference image, comparison and search can be performed at high accuracy even when no three-dimensional object model of each object can be obtained beforehand, or even when only one or few reference images exist.

Second Embodiment

Figure 8:
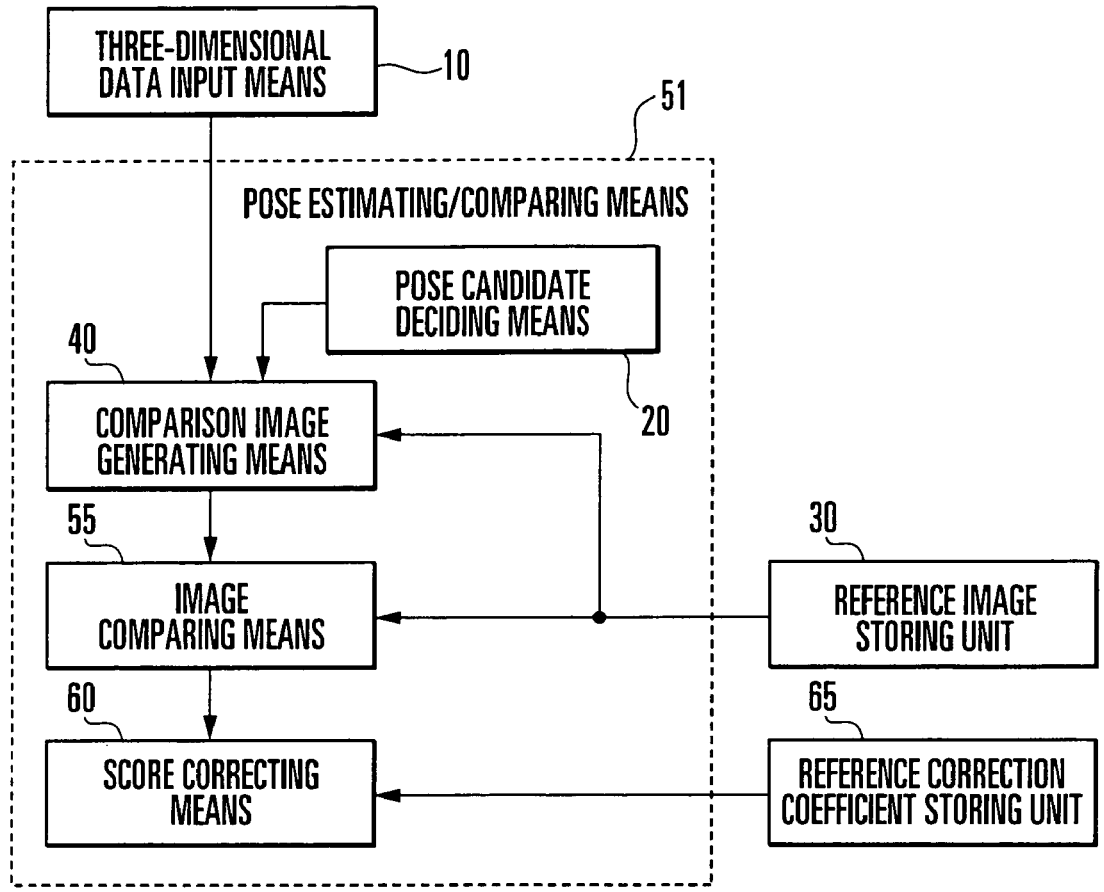
FIG. 8 is a block diagram showing the arrangement of the second embodiment of the present invention.

FIG. 8 is a block diagram showing the second embodiment of the present invention. The same reference numerals as in FIG. 1 denote the same parts in FIG. 8. This embodiment comprises a three-dimensional data input means 10, reference image storing unit 30, pose estimating/comparing means 51, and reference correction coefficient storing unit 65. The pose estimating/comparing means 51 includes a pose candidate deciding means 20, comparison image generating means 40, image comparing means 55, and score correcting means 60. The difference from FIG. 1 is the addition of the score correcting means 60 and reference correction coefficient storing unit 65.

Outlines of the operations of these means are as follows. First, the three-dimensional data input means 10, reference image storing unit 30, pose candidate deciding means 20, comparison image generating means 40, and image comparing means 55 perform the same processes as in the first embodiment shown in FIG. 1.

A coefficient for correcting a comparison score (a distance value or similarity degree) in relation to a reference image is prestored in the reference correction coefficient storing unit 65. The pose estimating/comparing means 51 calculates a minimum distance value (or a maximum similarity degree) between three-dimensional data input from the three-dimensional data input means 10 and a reference image obtained from the reference image storing unit 30, and also corrects this minimum distance value by using the correction coefficient obtained from the reference correction coefficient storing unit 65.

More specifically, the pose candidate deciding means 20 generates at least one pose candidate. The comparison image generating means 40 generates a comparison image close to a reference image while projecting three-dimensional data onto a two-dimensional image in accordance with the pose candidate. The image comparing means 55 calculates a distance value between the comparison image and the reference image, and selects a comparison image having the smallest distance value for each reference image, thereby estimating an optimum pose and obtaining a minimum distance value between the three-dimensional data and the reference image.

The score correcting means 60 corrects the minimum distance value by using a correction coefficient corresponding to the reference image. Also, in comparison (1:1 comparison) with one object (reference image), the score correcting means 60 compares the corrected minimum distance with a threshold value to determine whether the two objects are the same. Furthermore, in a process (1:N comparison) of searching a plurality of objects for an object (reference image) closest to input three-dimensional data, the score correcting means 60 selects a reference image having the smallest corrected minimum distance value.

The overall operation of 1:N comparison of this embodiment will be explained in detail below with reference to FIG. 8 and a flowchart in FIG. 9.

Figure 9:
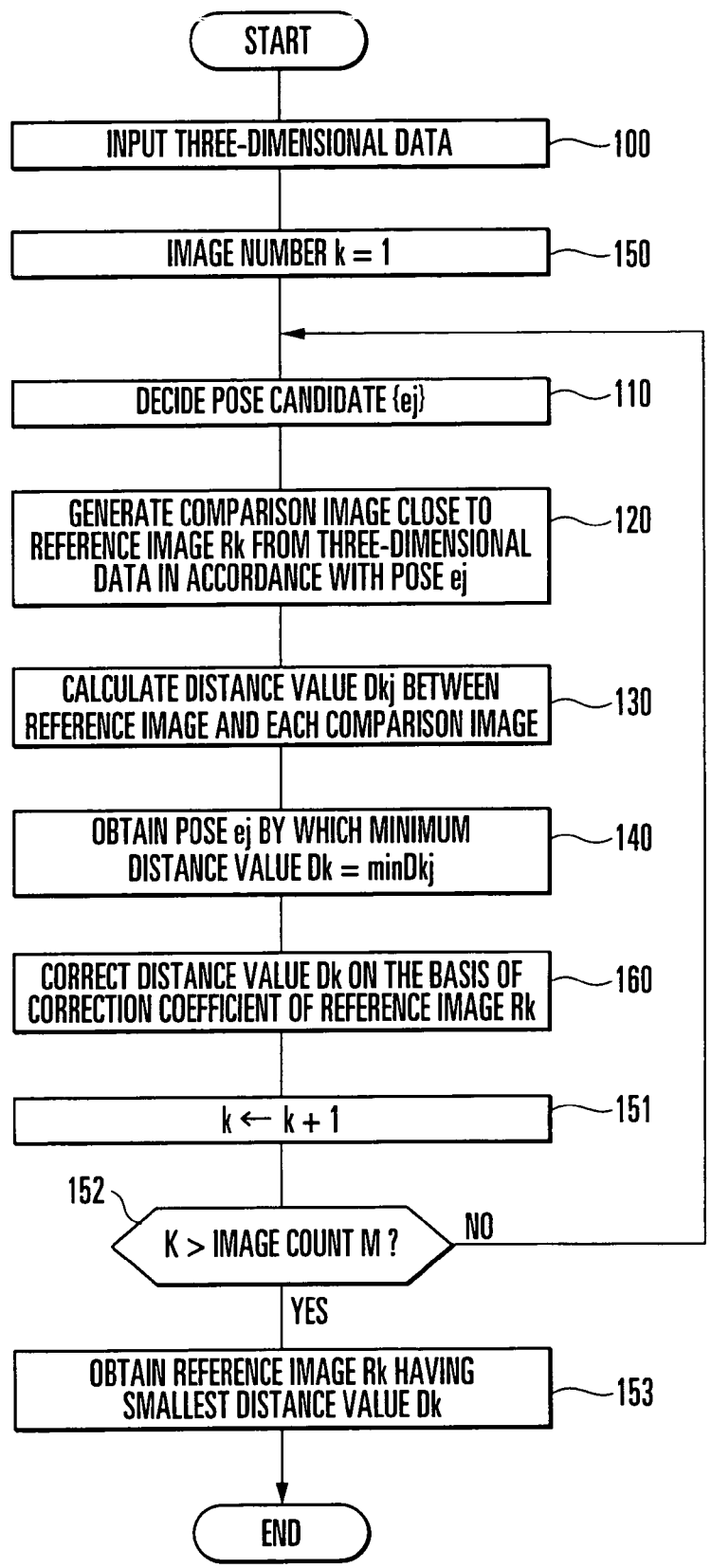
FIG. 9 is a flowchart showing the operation 1:N comparison in the second embodiment.

Referring to FIG. 9, the three-dimensional data input means 10 inputs three-dimensional data (step 100). Then, the pose estimating/comparing means 50 initially sets the image number of a reference image to k=1 (step 150). Also, the pose candidate deciding means 20, comparison image generating means 40, and image comparing means 55 estimate an optimum pose and calculate a minimum distance value between the three-dimensional data and a reference image $R_k$ by the same processes as in the first embodiment (steps 110 to 140).

Subsequently, the score correcting means 60 corrects the minimum distance value by using a correction coefficient corresponding to the reference image $R_k$ (step 160). The pose estimating/comparing means 51 increments the image number k by 1 (step 151), and compares the image number k with an image count M (step 152). If the image number k is equal to or smaller than the image count M, the flow returns to step 110 to perform the same processing, thereby calculating the minimum distance value of the next reference image, and correcting the minimum distance value by using a correction coefficient corresponding to the reference image. If the image number k is equal to or larger than the image count M in step 152, a reference image $R_k$ having the smallest corrected minimum distance value is output as a comparison result (step 153).

In 1:1 comparison, the processes in steps 100, 110, 120, 130, 140, and 160 are performed in the same manner as in the first embodiment, and the process in step 155 of FIG. 3 is performed after that. In step 155 of FIG. 3, whether the two objects are the same is determined by comparing the distance value with a threshold value as described earlier.

The operation of this embodiment will be explained in more detail below by using a practical example. First, as in the explanation of the first embodiment, reference images $R_k(r)$ as shown in FIG. 5 are stored in the reference image storing unit 30. Also, correction coefficients as shown in Table 1 are stored in the reference correction coefficient storing unit 65. For example, a correction coefficient $A_k$ is obtained from $A_k=A/E_k$ (A is a preset constant) by calculating a minimum distance value $D_k^h$ between each representative three-dimensional data (representative three-dimensional object model) $C_h$ (h=1, ..., H) prepared beforehand and a reference image $R_k$ by the image comparison system of the first embodiment, and calculating average value $E_k=\Sigma_h D_k^h/H$ of the minimum distance values (or the average value of high-order candidates having small minimum distance values). For example, if A=20 and the average values $E_k$ of the minimum distance values of individual reference images are {50, 40, 20}, the correction coefficients $A_k$ are as shown in Table 1. Table 1 indicates that, for example, a reference image $R_1$ is captured under bad conditions and has a large average distance value.

TABLE 1

| Image number | Correction coefficient |
|---|---|
| 1 | 0.4 |
| 2 | 0.5 |
| 3 | 1.0 |

Assume that three-dimensional data as shown in FIG. 6 is input from the three-dimensional data input means 10 (step 100 in FIG. 9). The pose estimating/comparing means 50 initially sets the image number of a reference image to k=1 (step 150). Then, the pose candidate deciding means 20, comparison image generating means 40, and image comparing means 55 estimate an optimum pose and calculate a minimum distance value between the three-dimensional data and the reference image $R_k$ by the same processes as in the first embodiment (steps 110 to 140).

Subsequently, the score correcting means 60 corrects the minimum distance value by using a correction coefficient corresponding to the reference image $R_k$ (step 160). For example, the minimum distance value $D_k$ can be corrected by $D_k'=A_k D_k$ by using the correction coefficient $A_k$. Also, the pose estimating/comparing means 51 increments the image number k by 1 (step 151), and compares the image number k with the image count M (step 152). If the image number k is equal to or smaller than the image count M, the flow returns to step 110 to perform the same processing, thereby calculating the minimum distance value of the next reference image, and correcting the minimum distance value by using a correction coefficient corresponding to the reference image. Finally, if the image number k is equal to or larger than the image count M in step 152, a reference image $R_k$ having the smallest corrected minimum distance value is output as a comparison result (step 153). For example, if the minimum distance values for the reference images $R_k$ are calculated as {40, 60, 25}, the minimum distance values corrected by using the correction coefficients shown in Table 1 are {16, 30, 25}, so the reference image $R_1$ is selected as a reference image having the smallest minimum distance value.

In this embodiment, three-dimensional data of an object is measured, and this three-dimensional data is compared and compared with a reference image while the pose and illumination condition are corrected. Therefore, comparison and search can be performed at high accuracy even when reference images of objects are captured under different conditions such as pose and illumination. Also, since three-dimensional data of an object is measured and this three-dimensional data is compared and compared with a reference image, comparison and search can be performed at high accuracy even when no three-dimensional object model of each object can be obtained beforehand, or even when only one or few reference images exist. Furthermore, since comparison is performed by correcting the comparison score fluctuations caused by the image sensing conditions of reference images, comparison and search can be performed at high accuracy even when the image sensing conditions of reference images are different or a reference image having poor image quality exists.

Note that in the second embodiment, the correction coefficient $A_k$ is stored, and the distance value is corrected as it is multiplied by the correction coefficient $A_k$. However, the present invention is not limited to this embodiment. For example, it is also possible to store all the minimum distance values $D_k^h$ between the representative three-dimensional models $C_h$ and the reference images $R_k$, or store function parameters of an assumed distribution function. When a normal distribution is assumed, for example, it is possible to store an average value $E_k$ and a standard deviation $\sigma_k$, and perform correction by $D_k'=(D_k-E_k)/\sigma_k$ so that the distribution is normalized to a standard normal distribution.

Third Embodiment

Figure 10:
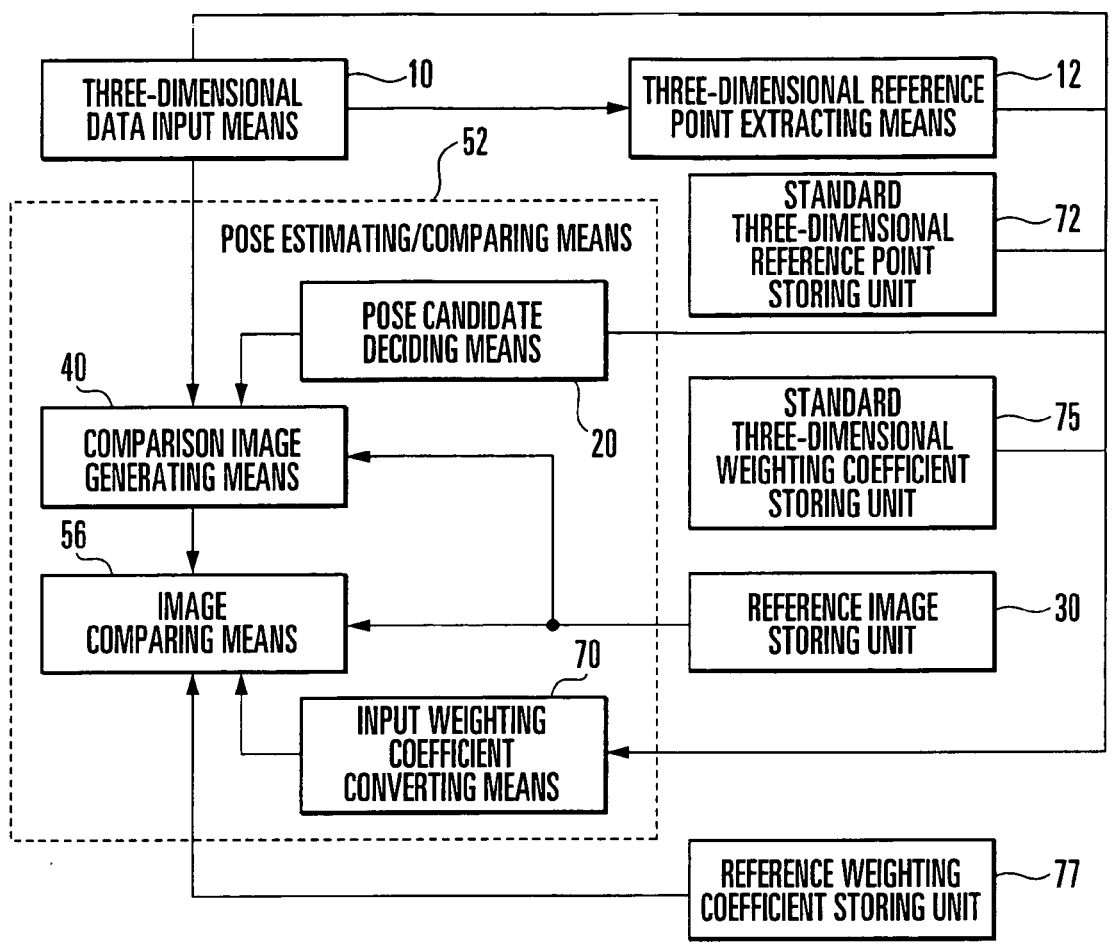
FIG. 10 is a block diagram showing the arrangement of the third embodiment of the present invention.

FIG. 10 is a block diagram showing the third embodiment of the present invention. The same reference numerals as in FIG. 1 denote the same parts in FIG. 10. This embodiment comprises a three-dimensional data input means 10, reference image storing unit 30, pose estimating/comparing means 52, three-dimensional reference point extracting means 12, standard three-dimensional reference point storing unit 72, standard three-dimensional weighting coefficient storing unit 75, and reference weighting coefficient storing unit 77. The pose estimating/comparing means 52 includes a pose candidate deciding means 20, comparison image generating means 40, image comparing means 56, and input weighting coefficient converting means 70.

Outlines of the operations of these means are as follows. First, the three-dimensional data input means 10, reference image storing unit 30, pose candidate deciding means 20, and comparison image generating means 40 perform the same processes as in the first embodiment shown in FIG. 1.

Standard three-dimensional reference points corresponding to standard three-dimensional object models are stored in the standard three-dimensional reference point storing unit 72. Standard three-dimensional weighting coefficients are stored in the standard three-dimensional weighting coefficient storing unit 75. Weighting coefficients corresponding to reference images are stored in the reference weighting coefficient storing unit 77.

The three-dimensional reference point extracting unit 12 manually or automatically extracts a three-dimensional reference point from three-dimensional data obtained from the three-dimensional data input means 10.

The pose estimating/comparing means 52 calculates a minimum distance value (or a maximum similarity degree) between the three-dimensional data obtained from the three-dimensional data input means 10 and a reference image obtained from the reference image storing unit 30, by using a weighting coefficient corresponding to the input data obtained from the input weighting coefficient converting means 70, or a weighting coefficient corresponding to the reference image obtained from the reference weighting coefficient storing unit 77.

More specifically, the pose candidate deciding means 20 generates at least one pose candidate. The comparison image generating means 40 generates a comparison image close to a reference image while projecting three-dimensional data onto a two-dimensional image in accordance with the pose candidate. The input weighting coefficient converting means 70 obtains the coordinate correspondence of the standard three-dimensional weighting coefficient obtained from the standard three-dimensional weighting coefficient storing unit 75 to the three-dimensional data obtained from the three-dimensional data input means 10 by using the standard three-dimensional reference point obtained from the standard three-dimensional reference point storing unit 72 and the three-dimensional reference point of the three-dimensional data obtained from the three-dimensional reference point extracting means 12, and converts the standard three-dimensional weighting coefficient into a two-dimensional weighting coefficient in accordance with the pose candidate obtained from the pose candidate deciding means 20.

Figure 11:
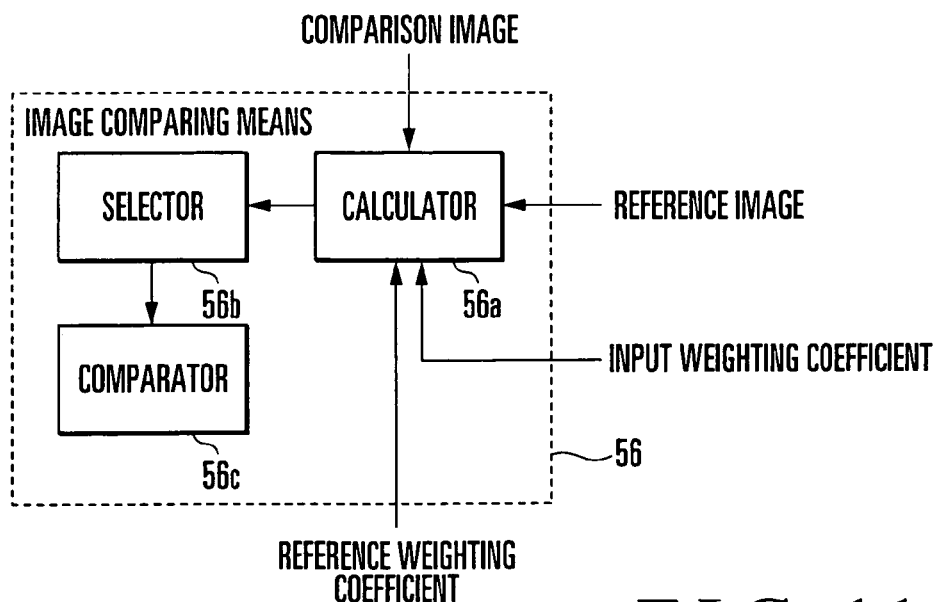
FIG. 11 is a block diagram showing the arrangement of an image comparing means of the third embodiment.

The image comparing means 56 includes a calculator 56a, selector 56b, and comparator 56c shown in FIG. 11. The image comparing means 56 calculates a distance value between the comparison image and the reference image in the calculator 56a by using the weighting coefficient obtained from the input weighting coefficient converting means 70 and corresponding to the input three-dimensional data or the weighting coefficient obtained from the reference weighting coefficient storing unit 77 and corresponding to the reference image, and selects a comparison image having the smallest distance value for each reference image in the selector 56b, thereby estimating an optimum pose and obtaining a minimum distance value between the three-dimensional data and the reference image. In addition, in comparison (1:1 comparison) with one object (reference image), the comparator 56c compares the minimum distance with a threshold value to determine whether the two objects are the same. Also, in a process (1:N comparison) of searching a plurality of objects for an object (reference image) closest to input three-dimensional data, the comparator 56c selects a reference image having the smallest minimum distance value.

The overall operation of 1:N comparison of this embodiment will be explained in detail below with reference to FIG. 10 and a flowchart in FIG. 12.

Figure 12:
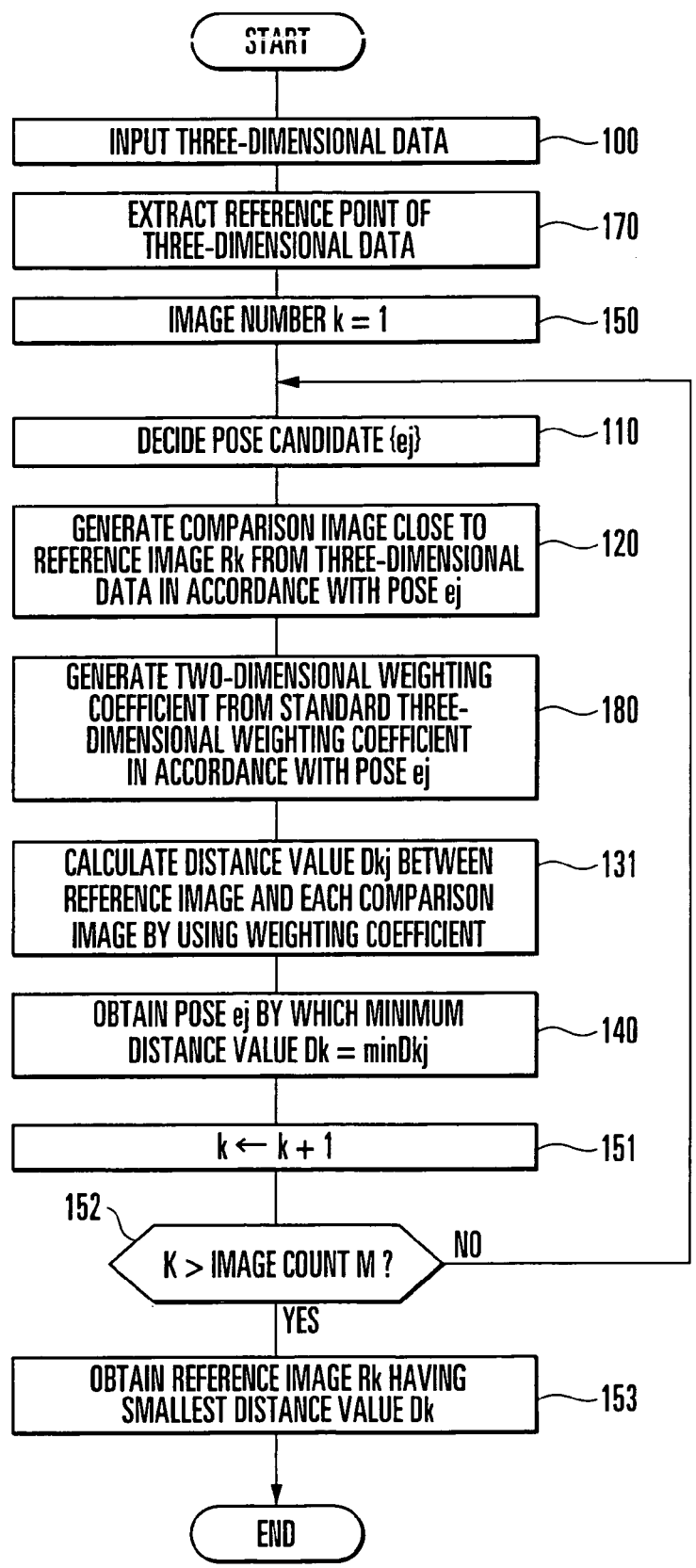
FIG. 12 is a flowchart showing the operation of 1:N comparison in the third embodiment.

Referring to FIG. 12, the three-dimensional data input means 10 inputs three-dimensional data (step 100). Then, the three-dimensional reference point extracting means 12 manually or automatically extracts a three-dimensional reference point from the three-dimensional data (step 170). The pose estimating/comparing means 52 initially sets the image number of a reference image to k=1 (step 150). The pose candidate deciding means 20 decides a pose candidate group $\{e_j\}$ (step 110).

Subsequently, the comparison image generating means 40 generates a comparison image close to a reference image $R_k$ while projecting the three-dimensional data onto a two-dimensional image in accordance with a pose candidate (step 120). The input weighting coefficient converting means 70 obtains the coordinate correspondence of the standard three-dimensional weighting coefficient to the three-dimensional data by using the standard three-dimensional reference point and the three-dimensional reference point of the three-dimensional data, and converts the standard three-dimensional weighting coefficient into a two-dimensional weighting coefficient in accordance with the pose candidate (step 180).

Then, the image comparing means 56 calculates a distance value between the comparison image and the reference image by using the weighting coefficient obtained from the input weighting coefficient converting means 70 and corresponding to the input three-dimensional data, or the weighting coefficient obtained from the reference weighting coefficient storing unit 77 and corresponding to the reference image (step 131), and selects a comparison image having the smallest distance value for each reference image, thereby estimating an optimum pose and obtaining a minimum distance value between the three-dimensional data and the reference image (step 140). Also, the pose estimating/comparing means 52 increments the image number k by 1 (step 151), and compares the image number k with an image count M (step 152). If the image number k is equal to or smaller than the image count M, the flow returns to step 110 to perform the same processing, thereby calculating the minimum distance value of the next reference image. Finally, if the image number k is equal to or larger than the image count M, a reference image $R_k$ having the smallest minimum distance value is output as a comparison result (step 153).

In 1:1 comparison, the processes in steps 100, 170, 110, 120, 180, 131, and 140 are performed in the same manner as in the first embodiment, and the process in step 155 of FIG. 3 is performed after that. In step 155 of FIG. 3, whether the two objects are the same is determined by comparing the distance value with a threshold value as described earlier.

Figure 13:
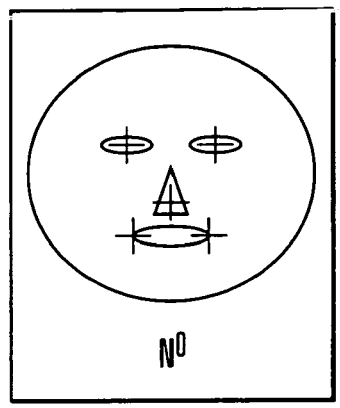
FIG. 13 is a view showing practical examples of standard three-dimensional reference points in the third embodiment.

The operation of this embodiment will be explained in more detail below by using a practical example. First, as in the explanation of the first embodiment, reference images $R_k(r)$ as shown in FIG. 5 are stored in the reference image storing unit 30. Also, standard three-dimensional reference points $N_i^0$ (i is the index of a reference point) corresponding to a standard three-dimensional object model as shown in FIG. 13 are stored in the standard three-dimensional reference point storing unit 72. Three-dimensional reference points are points for alignment. The example shown in FIG. 13 indicates five points, i.e., the middle point in the left eye, the middle point in the right eye, the tip of the nose, the left corner of the mouth, and the right corner of the mouth.

Although the three-dimensional reference points can be manually set in advance, it is also possible to automatically set them by using, e.g., a facial feature extracting method described in Marugame et al., "Extraction of Feature Portions from Facial Three-Dimensional Data Using Shape Information and Color Information", September, 2002, FIT (Forum of Information Science & Technology", 2002, I-100, pp. 199 & 200. The standard three-dimensional reference point can be calculated by the average coordinates of each three-dimensional reference point of a three-dimensional object model for learning prepared beforehand, or by a three-dimensional reference point obtained from a standard three-dimensional object model formed by averaging three-dimensional object models for learning.

Figure 14:
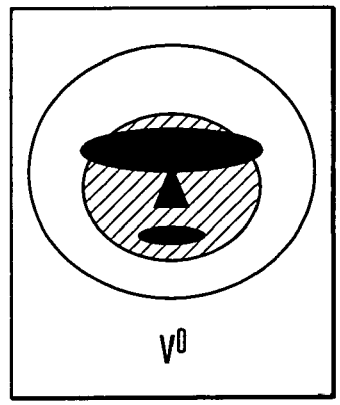
FIG. 14 is a view showing a practical example of a standard three-dimensional weighting coefficient in the third embodiment.

Also, a standard three-dimensional weighting coefficient $V_Q^0$ as shown in FIG. 14 is stored in the standard three-dimensional weighting coefficient storing unit 75. In this example shown in FIG. 14, a black region has a value of $V_Q^0=1$, a white region has a value of $V_Q^0=0$, and a hatched region has a value of $0<V_Q^0<1$. The standard three-dimensional weighting coefficient can be calculated by using three-dimensional weighting coefficients of three-dimensional object models for learning prepared beforehand, i.e., by aligning the three-dimensional weighting coefficients such that the three-dimensional reference point of each three-dimensional object model for learning matches the standard three-dimensional reference point, and averaging the aligned three-dimensional weighting coefficients.

Points other than the reference points can be aligned by determining the correspondence of the reference points by interpolation or extrapolation, thereby setting transformation formulas $s_0=Hs(s,t)$ and $t_0=Ht(s,t)$ of coordinate values $\{s,t\}$ of a three-dimensional weighting coefficient and coordinate values $\{s_0,t_0\}$ of a standard three-dimensional weighting coefficient. A three-dimensional weighting coefficient of a three-dimensional object model for learning can be learned in advance by using images for learning formed by sensing the image of an object of the three-dimensional object model for learning under various conditions. More specifically, the image comparison system of the first embodiment is used to obtain an optimum pose by using a three-dimensional object model for learning as input three-dimensional data and an image for learning as a reference image, and calculate errors between pixels of the reference image and a comparison image generated from the three-dimensional data when the optimum pose is obtained.

The weighting coefficient is an amount which represents the importance of a pixel in comparison. For example, the weight can be increased for a pixel having a small average error. The three-dimensional weighting coefficient can be set by calculating an average error by averaging errors between pixels of the comparison image and the reference image on the three-dimensional object model on the basis of the correspondence of the comparison image to the three-dimensional object model.

Figure 15:
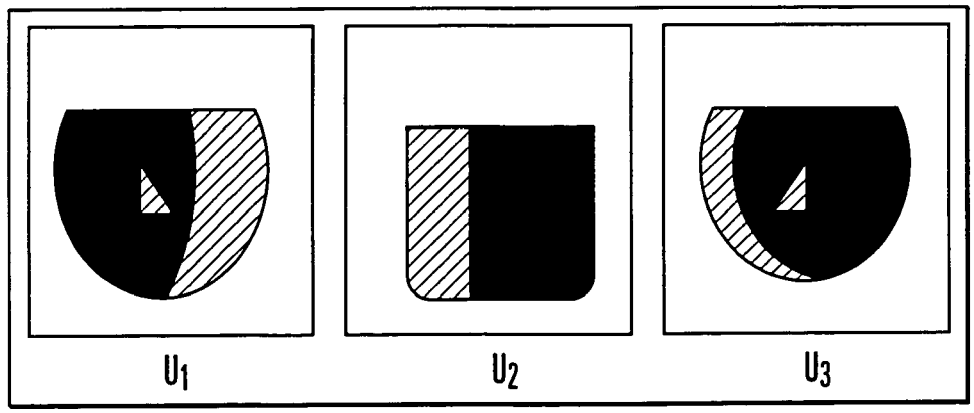
FIG. 15 is a view showing practical examples of reference weighting coefficients in the third embodiment.

Also, weighting coefficients $U_k(r)$ as shown in FIG. 15 corresponding to reference images are stored in the reference weighting coefficient storing unit 77. In the examples shown in FIG. 15, a black region has a value of $U_k(r)=1$, a white region has a value of $U_k(r)=0$, and a hatched region has a value of $0<U_k(r)<1$. A weighting coefficient corresponding to a reference image is manually or automatically set in advance by, e.g., setting the weight of a region except for a facial region to 0, or decreasing the weight of a region where the luminance value is large or small.

Figure 16:
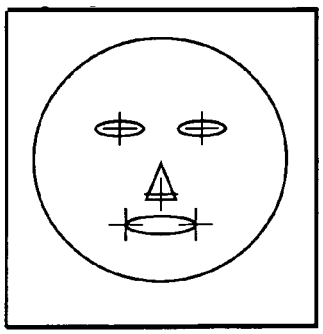
FIG. 16 is a view showing practical examples of input three-dimensional reference points in the third embodiment.

Assume that three-dimensional data as shown in FIG. 6 is input from the three-dimensional data input means 10 (step 100 in FIG. 12). The three-dimensional reference point extracting means 12 manually or automatically extracts a three-dimensional reference point from the three-dimensional data (step 170). FIG. 16 shows examples of the three-dimensional reference point extracted from the three-dimensional data shown in FIG. 6.

Then, the pose estimating/comparing means 52 initially sets the image number of a reference image to k=1 (step 150). The pose candidate deciding means 20 decides a pose candidate group $\{e_j\}$ (step 110). The comparison image generating means 40 generates a comparison image $G_{kj}(r)$ close to a reference image $R_k$ while projecting the three-dimensional data onto a two-dimensional image in accordance with a pose candidate (step 120). FIG. 7 shows examples of comparison images generated for a reference image $R_1$.

Figure 17:
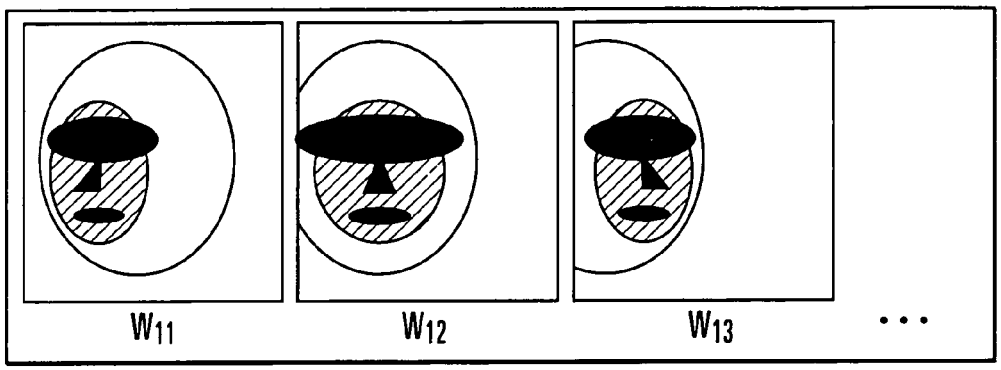
FIG. 17 is a view showing practical examples of two-dimensional weighting coefficients in the third embodiment.

Subsequently, the input weighting coefficient converting means 70 obtains the coordinate correspondence of the standard three-dimensional weighting coefficient to the three-dimensional data by using the standard three-dimensional reference point and the three-dimensional reference point of the three-dimensional data, and converts the standard three-dimensional weighting coefficient $V_Q^0$ into a two-dimensional weighting coefficient $W_{kj}(r)$ in accordance with the pose candidate (step 180). FIG. 17 shows examples of two-dimensional weighting coefficients generated for the comparison images shown in FIG. 7.

Then, the image comparing means 56 calculates a distance value $D_{kj}'$ between the comparison image and the reference image by using the weighting coefficient $W_{kj}(r)$ obtained from the input weighting coefficient converting means 70 and corresponding to the input data, or the weighting coefficient $U_k(r)$ obtained from the reference weighting coefficient storing unit 77 and corresponding to the reference image (step 131), and selects a comparison image having the smallest distance value for each reference image, thereby estimating an optimum pose and obtaining a minimum distance value between the three-dimensional data and the reference image (step 140).

When a weighted Euclid distance is used, for example, the distance value $D_{kj}'$ is calculated by $$D_{kj}'=\Sigma_r W_{kj}(r) U_k(r) \{R_k(r)-G_{kj}(r)\}^2$$

It is also possible to use only one of the weighting coefficients $W_{kj}(r)$ and $U_k(r)$. Then, the pose estimating/comparing means 52 increments the image number k by 1 (step 151), and compares the image number k with the image count M (step 152). If the image number k is equal to or smaller than the image count M, the flow returns to step 110 to perform the same processing, thereby calculating the minimum distance value of the next reference image. Finally, if the image number k is equal to or larger than the image count M in step 152, a reference image $R_k$ having the smallest minimum distance value is output as a comparison result (step 153).

In this embodiment, three-dimensional data of an object is measured, and this three-dimensional data is compared and compared with a reference image while the pose and illumination condition are corrected. Therefore, comparison and search can be performed at high accuracy even when reference images of objects are captured under different conditions such as pose and illumination. Also, since three-dimensional data of an object is measured and this three-dimensional data is compared and compared with a reference image, comparison and search can be performed at high accuracy even when no three-dimensional object model of each object can be obtained beforehand, or even when only one or few reference images exist. The accuracy of comparison and search can be further increased because image comparison is performed by weighted comparison using a weighting coefficient corresponding to each portion.

Note that although the third embodiment uses one standard three-dimensional weighting coefficient (and one standard three-dimensional reference point), a plurality of weighting coefficients may also be used. In this case, information indicating the correspondence of standard three-dimensional weighting coefficients to reference images is prestored. Also, the standard three-dimensional weighting coefficient is calculated by an error average between pixels of an image for learning and a comparison image generated from a three-dimensional object model for learning. However, the present invention is not limited to this embodiment. Furthermore, in pose estimation, a weighted distance is calculated by using a weighting coefficient. However, it is also possible to calculate a distance without using any weighting coefficient in pose estimation, and calculate a weighted distance after an optimum pose is obtained.

Fourth Embodiment

Figure 18:
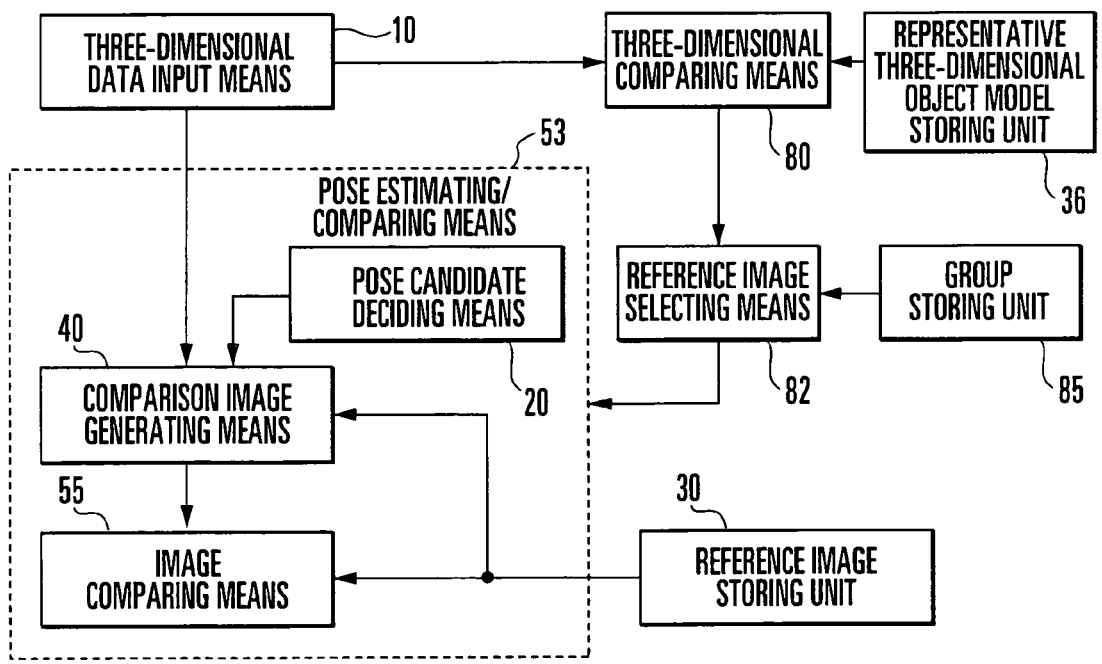
FIG. 18 is a block diagram showing the arrangement of the fourth embodiment of the present invention.

FIG. 18 is a block diagram showing the fourth embodiment of the present invention. The same reference numerals as in FIG. 1 denote the same parts in FIG. 18. This embodiment comprises a three-dimensional data input means 10, reference image storing unit 30, pose estimating/comparing means 53, representative three-dimensional object model storing unit 36, three-dimensional comparing means 80, group storing unit 85, and reference image selecting means 82. The pose estimating/comparing means 53 includes a pose candidate deciding means 20, comparison image generating means 40, and image comparing means 55.

Outlines of the operations of these means are as follows. First, the three-dimensional data input means 10, reference image storing unit 30, pose candidate deciding means 20, comparison image generating means 40, and image comparing means 55 perform the same processes as in the first embodiment shown in FIG. 1.

Also, representative three-dimensional object models prepared beforehand are stored in the representative three-dimensional object model storing unit 36. Related information of representative three-dimensional object models and reference images (information indicating the correspondence of the representative three-dimensional object models to the reference images) is prestored in the group storing unit 85.

The three-dimensional comparing means 80 compares three-dimensional data obtained from the three-dimensional data input means 10 with each representative three-dimensional object model obtained from the representative three-dimensional object model storing unit 36, and selects the most similar representative three-dimensional object model. The reference image selecting means 82 selects a reference image group corresponding to the representative three-dimensional object model selected by the three-dimensional comparing means 80, on the basis of the related information obtained from the group storing unit 85.

The pose estimating/comparing means 53 calculates a minimum distance value (or a maximum similarity degree) between the three-dimensional data obtained from the three-dimensional data input means 10 and each reference image obtained from the reference image storing unit 30, and selects a reference image having the smallest minimum distance value. The reference images herein used are those of the reference image group obtained from the reference image selecting means 82.

The overall operation of this embodiment will be explained in detail below with reference to FIG. 8 and flowcharts in FIGS. 19 and 20. First, the three-dimensional data input means 10 inputs three-dimensional data (step 100 in FIG. 19). Then, the three-dimensional comparing means 80 initially sets the model number of a representative three-dimensional object model to h=1 (step 210). The three-dimensional comparing means 80 calculates a similarity degree $S_h$ between the three-dimensional data and each representative three-dimensional object model $C_h$ (step 220). Subsequently, the three-dimensional comparing means 80 increments the model number h by 1 (step 211), and compares the model number h with a model count H (step 212). If the model number h is equal to or smaller than the model count H, the flow returns to step 210 to perform the same processing, thereby calculating the similarity degree of the next representative three-dimensional object model.

If comparison with all the representative three-dimensional object models is completed in step 212, a model $C_h$ having the largest similarity degree is selected (step 221). Then, the reference image selecting means 82 selects a reference image group corresponding to the selected representative three-dimensional object model, on the basis of the related information obtained from the group storing unit 85 (step 230). Note that step 230 in FIG. 19 continues to step 150 in FIG. 20.

Subsequently, the pose estimating/comparing means 53 initially sets the image number of a reference image to k=1 (step 150 in FIG. 20). The pose estimating/comparing means 53 determines whether a reference image $R_k$ is included in a selected reference image group L (step 240). If the reference image $R_k$ is included in the reference image group, the flow advances to step 110; if not, the flow advances to step 151.

If the flow advances to step 110, the pose candidate deciding means 20, comparison image generating means 40, and image comparing means 55 estimate an optimum pose and calculate a minimum distance value between the three-dimensional data and the reference image $R_k$ by the same processes as in the first embodiment (steps 110 to 140). Then, the pose estimating/comparing means 53 increments the image number k by 1 (step 151), and compares the image number k with an image count M (step 152). If the image number k is equal to or smaller than the image count M, the flow returns to step 240 to perform the same processing. Finally, if the image number k is equal to or larger than the image count M, a reference image $R_k$ having the smallest minimum distance value is output as a comparison result (step 153).

Figure 21:
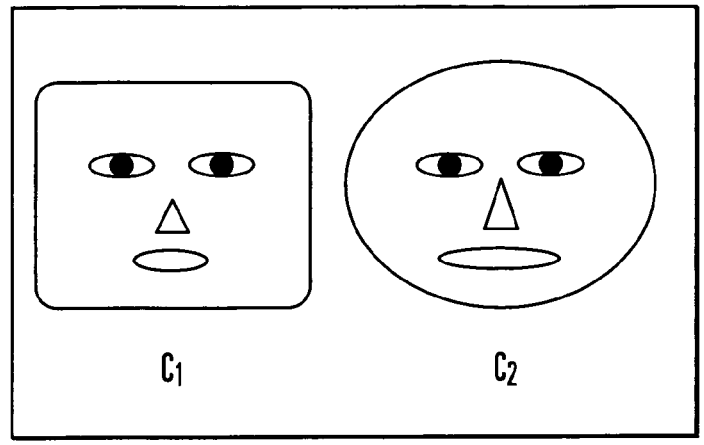
FIG. 21 is a view showing practical examples of representative three-dimensional object models in the fourth embodiment.

The operation of this embodiment will be explained in more detail below by using a practical example. First, as in the explanation of the first embodiment, reference images $R_k(r)$ as shown in FIG. 5 are stored in the reference image storing unit 30. Also, representative three-dimensional object models $C_h$ as shown in FIG. 21 are stored in the representative three-dimensional object model storing unit 36. As shown in Table 2, the image numbers of upper candidates (reference images) obtained by comparing reference images with representative three-dimensional object models are stored in the group storing unit 85 in relation to these three-dimensional object models. That is, if the comparison results when the representative three-dimensional object models $C_h$ are input to the image comparison system of the first embodiment are as shown in Table 3, for example, a list as shown in Table 2 is obtained by leaving reference image candidates having distance values of 40 or less behind.

TABLE 2

| Model number | Reference image number |
|---|---|
| 1 | 2 |
| 2 | 1, 3 |

TABLE 3

| Model number | Reference image number:distance value |
|---|---|
| 1 | 2:20 1:50 3:60 |
| 2 | 1:25 3:30 2:70 |

Figure 19:
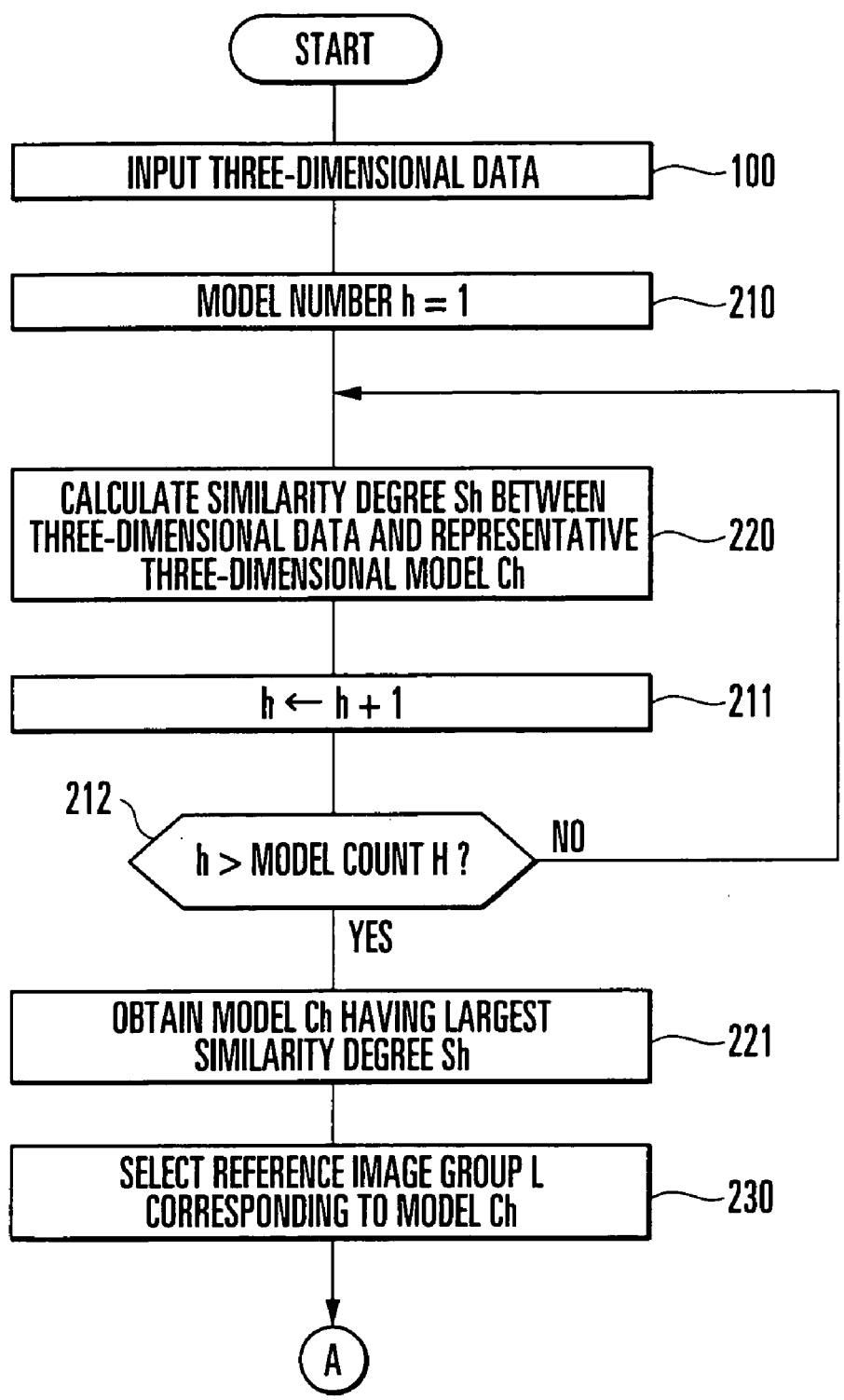
FIG. 19 is a flowchart showing the operation of the fourth embodiment.

Assume that three-dimensional data as shown in FIG. 6 is input from the three-dimensional data input means 10 (step 100 in FIG. 19). The three-dimensional comparing means 80 initially sets the model number of a representative three-dimensional object model to h=1 (step 210). Then, the three-dimensional comparing means 80 calculates the similarity degree $S_h$ between the three-dimensional data and each representative three-dimensional object model $C_h$ (step 220). As a means for comparing these three-dimensional data, it is possible to use an existing technique such as a three-dimensional shape identification apparatus described in Japanese Patent Laid-Open No. 4-119475.

Subsequently, the model number h is incremented by 1 (step 211), and the model number h is compared with the model count H (step 212). If the model number h is equal to or smaller than the model count H, the flow returns to step 210 to perform the same processing, thereby calculating the similarity degree of the next representative three-dimensional object model. If comparison with all the representative three-dimensional object models is completed in step 212, a model $C_h$ having the largest similarity degree is selected (step 221).

For example, if the similarity degrees of models $C_h$ are $\{0.7, 0.9\}$, a model $C_2$ is selected. Then, the reference image selecting means 82 selects a reference image group $\{R_1, R_2\}$ corresponding to the selected three-dimensional object model $C_2$ from the list shown in Table 2 obtained from the group storing unit 85 (step 230). After that, the flow advances to processing shown in FIG. 20.

Figure 20:
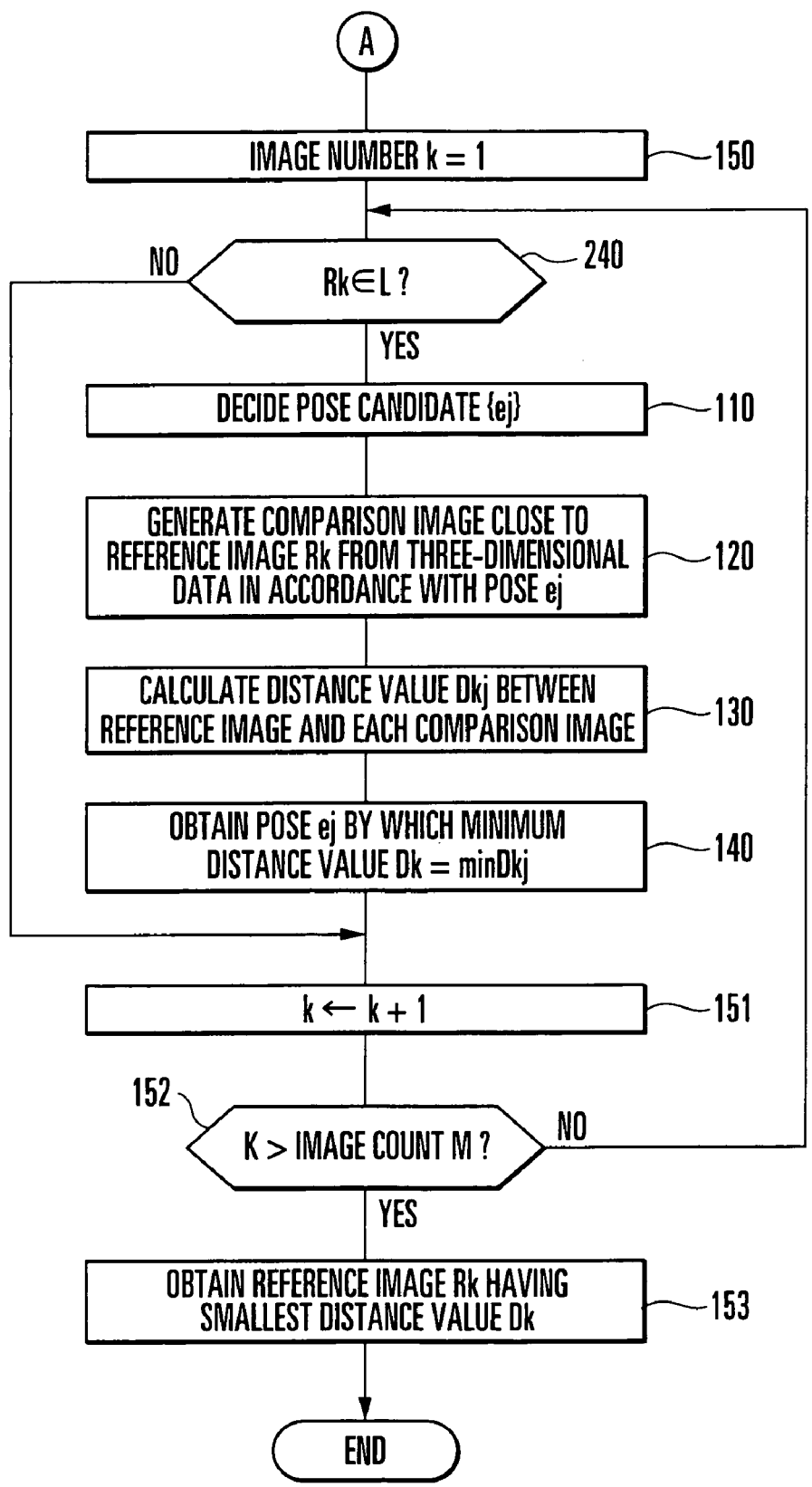
FIG. 20 is a flowchart showing the operation of the fourth embodiment.

The pose estimating/comparing means 53 initially sets the image number of a reference image to k=1 (step 150 in FIG. 20). The pose estimating/comparing means 53 determines whether a reference image $R_k$ is included in the selected reference image group L (step 240). If the reference image $R_k$ is included in the selected reference image group, the flow advances to step 110; if not, the flow advances to step 151.

In this example, the flow advances to step 110 if the reference image is $R_1$ or $R_3$, and advances to step 151 if the reference image is $R_2$. If the flow advances to step 110, the pose candidate deciding means 20, comparison image generating means 40, and image comparing means 55 estimate an optimum pose and calculate a minimum distance value between the three-dimensional data and the reference image $R_k$ by the same processes as in the first embodiment (steps 110 to 140). Then, the pose estimating/comparing means 53 increments the image number k by 1 (step 151), and compares the image number k with the image count M (step 152). If the image number k is equal to or smaller than the image count M, the flow returns to step 240 to perform the same processing. In this example, a minimum distance value is calculated if the reference image is $R_1$ or $R_3$. Finally, if the image number k is equal to or larger than the image count M in step 152, a reference image $R_k$ having the smallest minimum distance value is output as a comparison result (step 153).

In this embodiment, three-dimensional data of an object is measured, and this three-dimensional data is compared and compared with a reference image while the pose and illumination condition are corrected. Therefore, comparison and search can be performed at high accuracy even when reference images of objects are captured under different conditions such as pose and illumination. Also, since three-dimensional data of an object is measured and this three-dimensional data is compared and compared with a reference image, comparison and search can be performed at high accuracy even when no three-dimensional object model of each object can be obtained beforehand, or even when only one or few reference images exist. Furthermore, high-speed search can be performed because a reference image is selected by comparison with a representative three-dimensional object model.

Note that although one representative three-dimensional object model is selected in the fourth embodiment, a plurality of representative three-dimensional object models may also be selected. In this case, a union of reference image groups corresponding to the individual representative three-dimensional object models is a reference image group.

Fifth Embodiment

Figure 22:
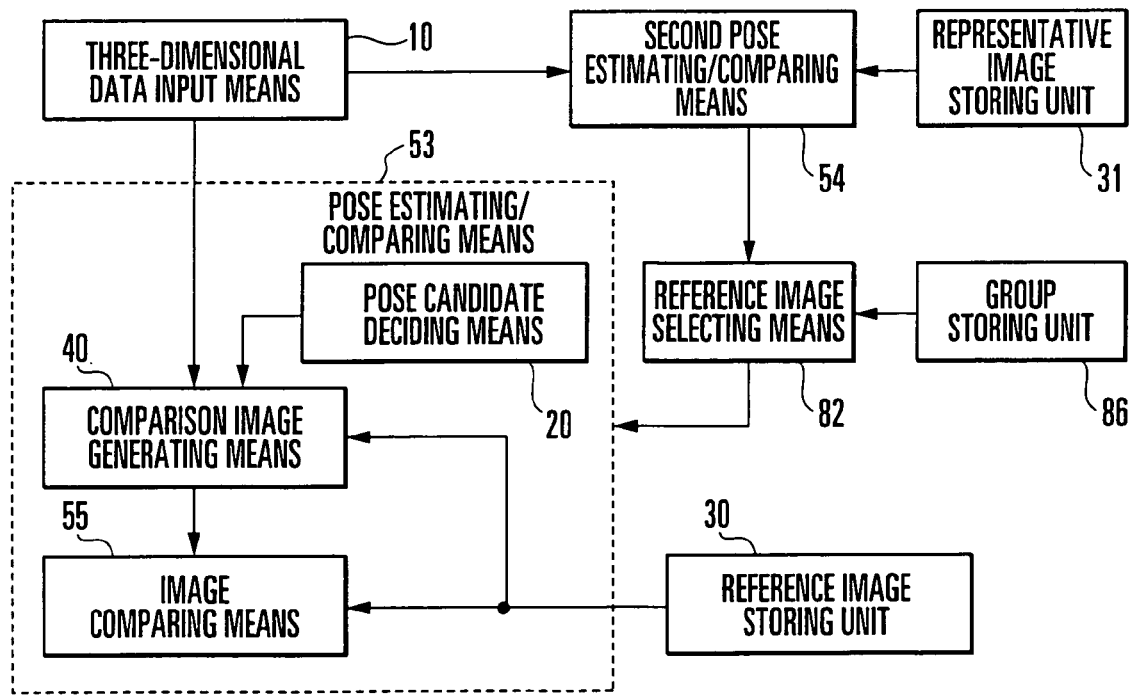
FIG. 22 is a block diagram showing the arrangement of the fifth embodiment of the present invention.

FIG. 22 is a block diagram showing the fifth embodiment of the present invention. The same reference numerals as in FIGS. 1 and 18 denote the same parts in FIG. 22. This embodiment comprises a three-dimensional data input means 10, reference image storing unit 30, pose estimating/comparing means 53, representative storing unit 31, second pose estimating/comparing means (representative image selecting means) 54, group storing unit 86, and reference image selecting means 82. The pose estimating/comparing means 53 include a pose candidate deciding means 20, comparison image generating means 40, and image comparing means 55.

Outlines of the operations of these means are as follows. First, the three-dimensional data input means 10, reference image storing unit 30, pose candidate deciding means 20, comparison image generating means 40, and image comparing means 55 perform the same processes as in the first embodiment shown in FIG. 1.

Also, representative images prepared beforehand are stored in the representative image storing unit 31. A representative image can be a part of a reference image in the reference image storing unit 30, or a new image generated by, e.g., the average of reference images. When a representative image is a part of a reference image in the reference image storing unit 30, it is also possible to store only an image number and refer to the reference image in the reference image storing unit 30.

Related information of representative images and reference images (information indicating the correspondence of the representative images to the reference images) is prestored in the group storing unit 86. The second pose estimating/comparing means 54 compares three-dimensional data obtained from the three-dimensional data input means 10 with each representative image obtained from the representative image storing unit 31, and selects the most similar representative image. The reference image selecting means 82 selects a reference image group corresponding to the representative image selected by the second pose estimating/comparing means 54, on the basis of the related information obtained from the group storing unit 86.

The pose estimating/comparing means 53 calculates a minimum distance value (or a maximum similarity degree) between the three-dimensional data obtained from the three-dimensional data input means 10 and each reference image obtained from the reference image storing unit 30, and selects a reference image having the smallest minimum distance value. The reference images herein used are those of the reference image group obtained from the reference image selecting means 82.

Figure 23:
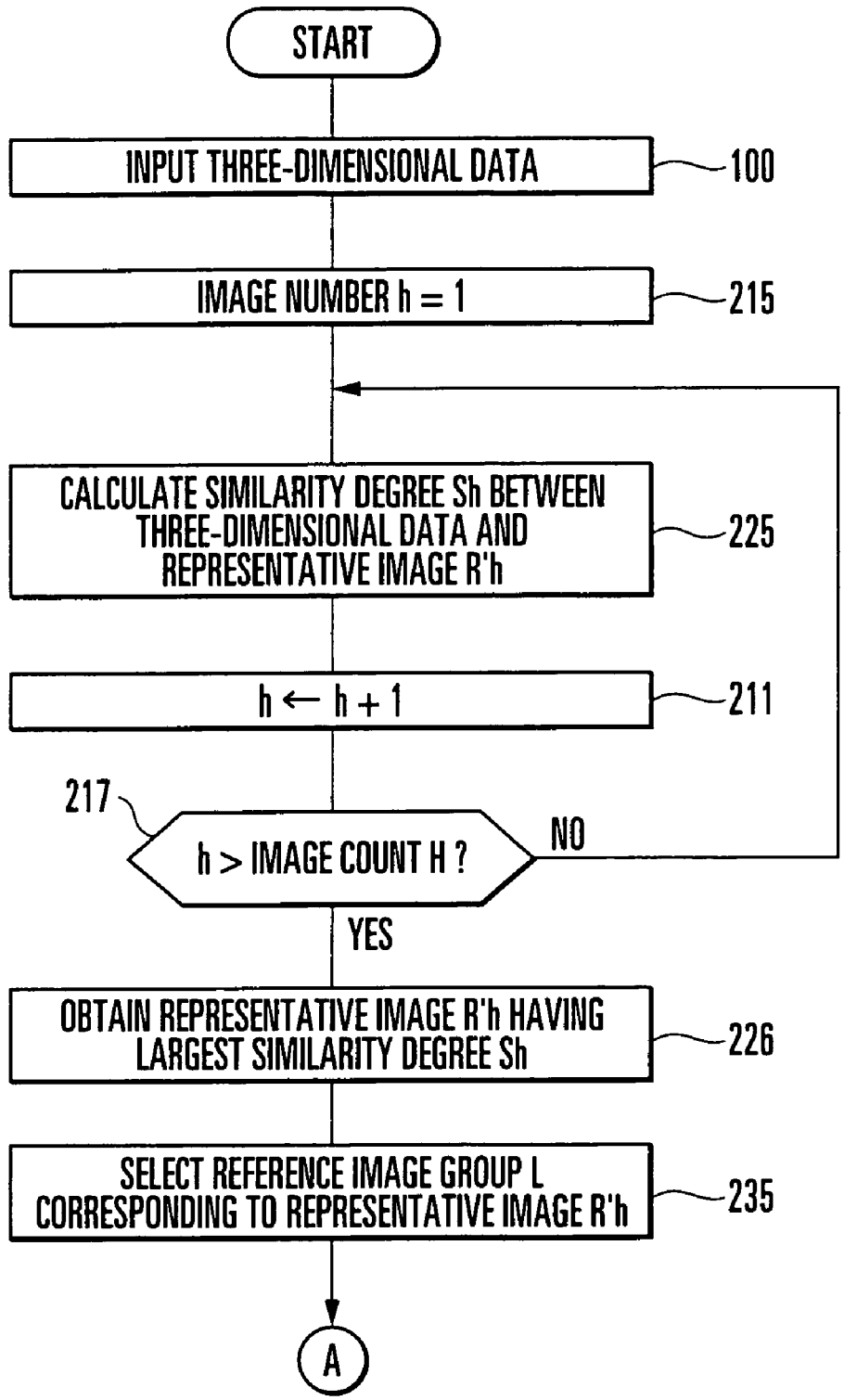
FIG. 23 is a flowchart showing the operation of the fifth embodiment.

The overall operation of this embodiment will be explained in detail below with reference to FIG. 22 and flowcharts in FIGS. 23 and 20. First, as shown in FIG. 23, the three-dimensional data input means 10 inputs three-dimensional data (step 100 in FIG. 23). Then, the second pose estimating/comparing means 54 initially sets the image number of a representative image to h=1 (step 215). The second pose estimating/comparing means 54 calculates a similarity degree $S_h$ between the three-dimensional data and each representative image $R'_h$ (step 225).

Subsequently, the image number h is incremented by 1 (step 211), and the image number h is compared with an image count H (step 217). If the image number h is equal to or smaller than the image count H, the flow returns to step 225 to perform the same processing, thereby calculating the similarity degree of the next representative image. If comparison with all the representative images is completed in step 217, a representative image $R'_h$ having the largest similarity degree is selected (step 226). Then, the reference image selecting means 82 selects a reference image group corresponding to the selected representative image, on the basis of the related information obtained from the group storing unit 86 (step 235). Note that step 235 in FIG. 23 continues to step 150 in FIG. 20.

The pose estimating/comparing means 53 initially sets the image number of a reference image to k=1 (step 150 in FIG. 20). The pose estimating/comparing means 53 then determines whether a reference image $R_k$ is included in the selected reference image group (step 240). If the reference image $R_k$ is included in the selected reference image group, the flow advances to step 110; if not, the flow advances to step 151.

If the flow advances to step 110, the pose candidate deciding means 20, comparison image generating means 40, and image comparing means 55 estimate an optimum pose and calculate a minimum distance value between the three-dimensional data and the reference image $R_k$ by the same processes as in the first embodiment (steps 110 to 140). Subsequently, the pose estimating/comparing means 53 increments the image number k by 1 (step 151), and compares the image number k with the image count M (step 152). If the image number k is equal to or smaller than the image count M, the flow returns to step 240 to perform the same processing, thereby calculating the minimum distance value of the next reference image. Finally, if the image number k is equal to or larger than the image count M in step 152, a reference image $R_k$ having the smallest minimum distance value is output as a comparison result (step 153).

Figure 24:
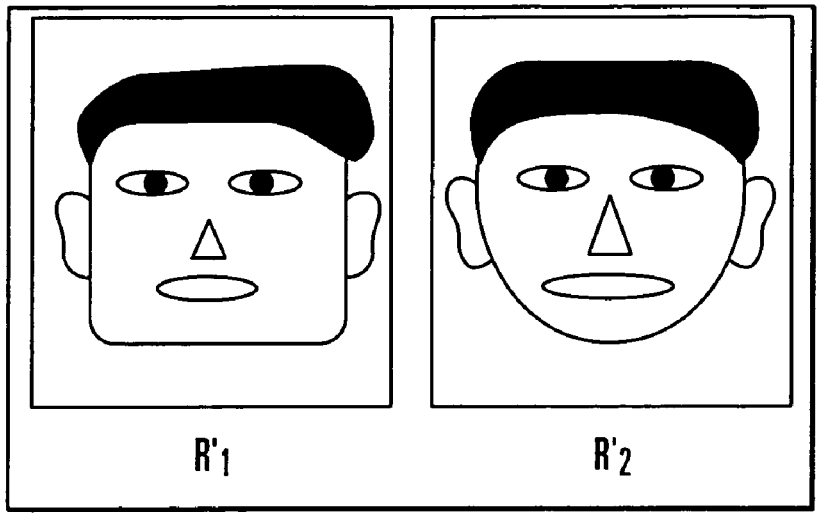
FIG. 24 is a view showing practical examples of representative images in the fifth embodiment.
Figure 25:
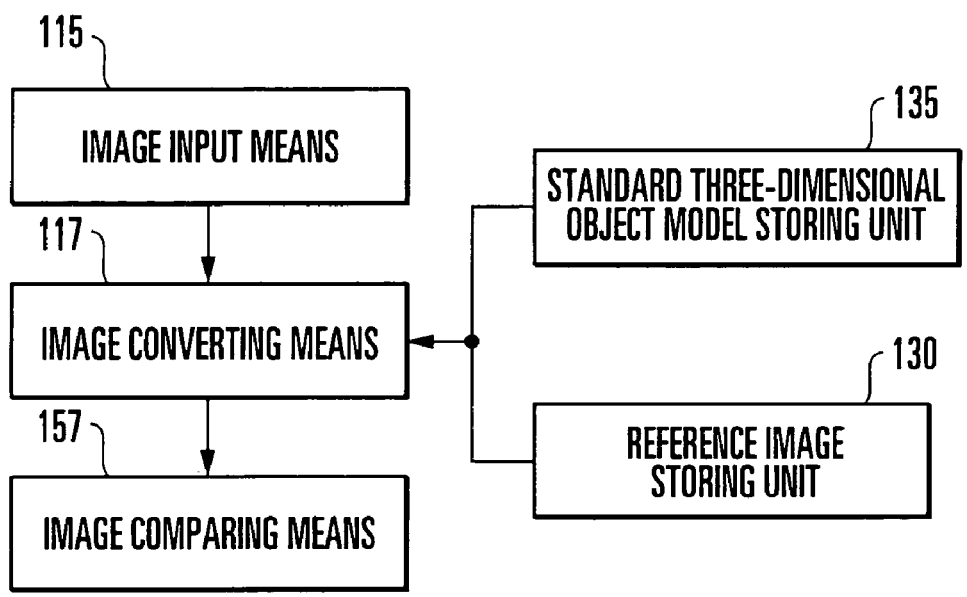
FIG. 25 is a block diagram showing a conventional image comparison system.
Figure 26:
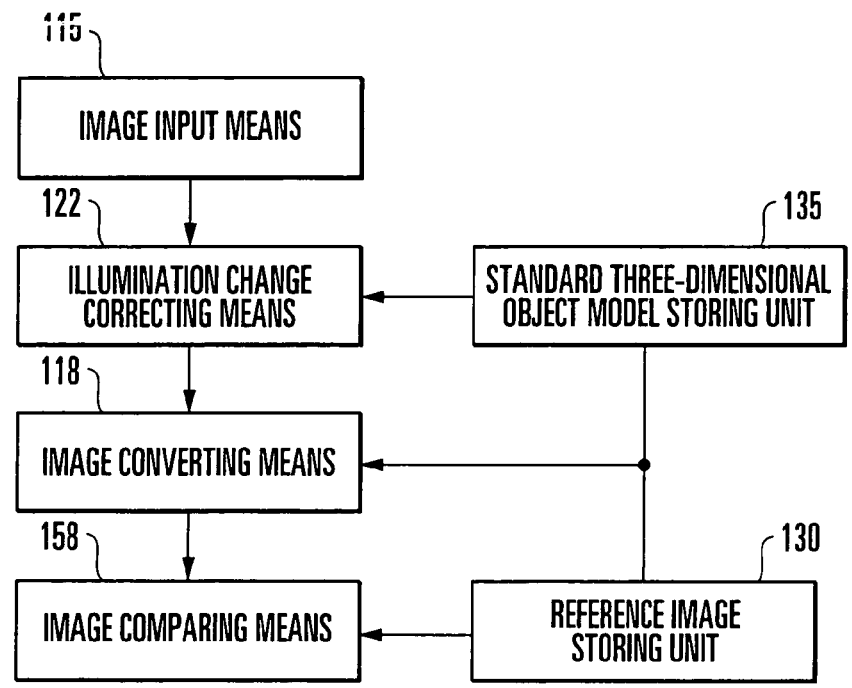
FIG. 26 is a block diagram showing another conventional image comparison system.
Figure 27:
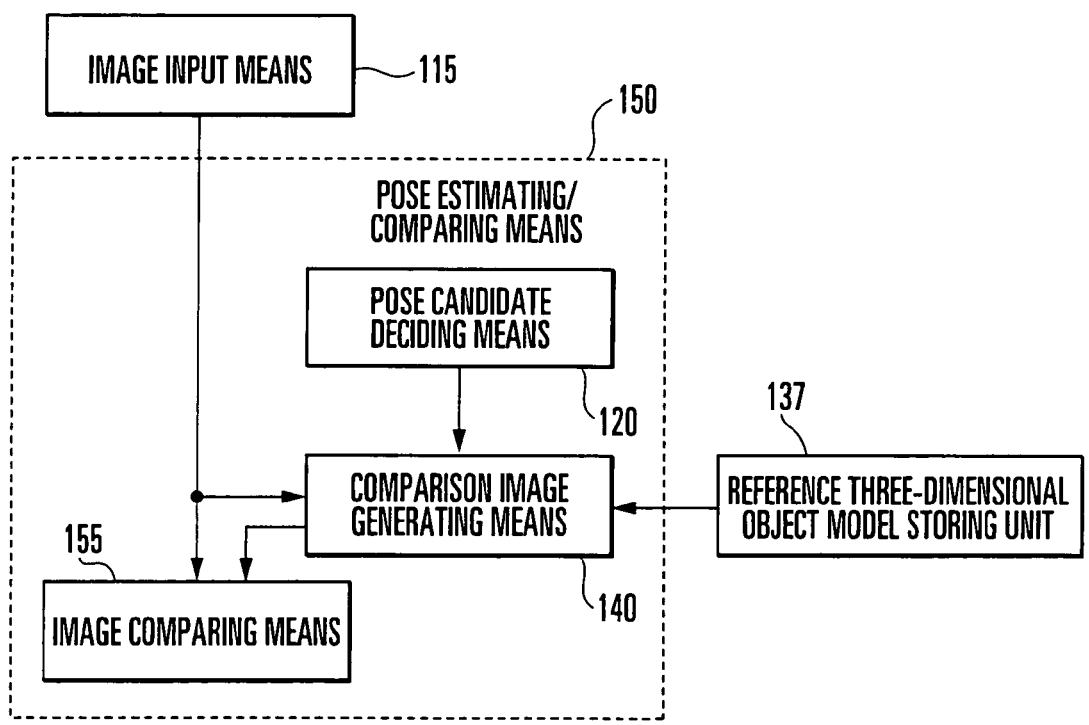
FIG. 27 is a block diagram showing still another conventional image comparison system.

The operation of this embodiment will be explained in more detail below by using a practical example. First, as in the explanation of the first embodiment, reference images $R_k(r)$ as shown in FIG. 5 are stored in the reference image storing unit 30. Also, representative images $R'_h$ as shown in FIG. 24 are stored in the representative image storing unit 31. As shown in Table 4, the image numbers of upper candidates (reference images) obtained by comparing reference images with representative images are stored in the group storing unit 86 in relation to these representative images. In this comparison, the existing image comparison system described in, e.g., patent reference 1 or 2 described previously can be used.

TABLE 4

| Image number | Reference image number |
|---|---|
| 1 | 2 |
| 2 | 1, 3 |

Assume that three-dimensional data as shown in FIG. 6 is input from the three-dimensional data input means 10 (step 100 in FIG. 23). The second pose estimating/comparing means 54 initially sets the image number of a representative image to h=1 (step 215). Then, the second pose estimating/comparing means 54 calculates the similarity degree $S_h$ between the three-dimensional data and each representative image $R'_h$ (step 225). Subsequently, the second pose estimating/comparing means 54 increments the image number h by 1 (step 211), and compares the image number h with the image count H (step 217). If the image number h is equal to or smaller than the image count H, the flow returns to step 215 to perform the same processing, thereby calculating the similarity degree of the next representative image.

If comparison with all the representative images is completed in step 217, a representative image $R'_h$ having the largest similarity degree is selected (step 226). For example, if the similarity degrees of representative images $R'_h$ are {0.7, 0.9}, a representative image $R'_2$ is selected. Then, the reference image selecting means 82 selects a reference image group {$R_1$, $R_3$} corresponding to the selected representative image $R'_2$ from the list shown in Table 4 obtained from the group storing unit 86 (step 235). After that, the processing shown in FIG. 20 is performed.

The pose estimating/comparing means 53 initially sets the image number of a reference image to k=1 (step 150 in FIG. 20). The pose estimating/comparing means 53 then determines whether a reference image $R_k$ is included in the selected reference image group (step 240). If the reference image $R_k$ is included in the selected reference image group, the flow advances to step 110; if not, the flow advances to step 151.

In this example, the flow advances to step 110 if the reference image is $R_1$ or $R_3$, and advances to step 151 if the reference image is $R_2$. If the flow advances to step 110, the pose candidate deciding means 20, comparison image generating means 40, and image comparing means 55 estimate an optimum pose and calculate a minimum distance value between the three-dimensional data and the reference image $R_k$ by the same processes as in the first embodiment (steps 110 to 140). Subsequently, the pose estimating/comparing means 53 increments the image number k by 1 (step 151), and compares the image number k with the image count M (step 152). If the image number k is equal to or smaller than the image count M, the flow returns to step 240 to perform the same processing. In this example, a minimum distance value is calculated if the reference image is $R_1$ or $R_3$. Finally, if the image number k is equal to or larger than the image count M in step 152, a reference image $R_k$ having the smallest minimum distance value is output as a comparison result (step 153).

Note that although one representative image is selected in the fifth embodiment, a plurality of representative images may also be selected. In this case, a union of reference image groups corresponding to the individual representative images is a reference image group.

In this embodiment, three-dimensional data of an object is measured, and this three-dimensional data is compared and compared with a reference image while the pose and illumination condition are corrected. Therefore, comparison and search can be performed at high accuracy even when reference images of object are captured under different conditions such as pose and illumination. Also, since three-dimensional data of an object is measured and this three-dimensional data is compared and compared with a reference image, comparison and search can be performed at high accuracy even when no three-dimensional object model of each object can be obtained beforehand, or even when only one or few reference images exist. Furthermore, high-speed search can be performed because a reference image is selected by comparison with a representative image.

Note that in each of the first to fifth embodiments, three-dimensional data (model) has as its information a shape and texture in a three-dimensional space (x,y,z) on the object surface. However, the present invention is not limited to these embodiments as long as equivalent information is obtained. For example, it is also possible to use a distance image which expresses a distance to the object surface in a certain direction as an image, and a texture image captured in the same direction.

The functions of the individual means as constituent elements of the image comparison system of the present invention can of course be implemented as hardware, and can also be implemented by loading an image comparison program (application) which executes the functions of the means of the first to fifth embodiments into a memory of a computer processor, thereby controlling the computer processor. This image comparison program is stored in a recording medium such as a magnetic disk or semiconductor memory, and implements the functions described above by controlling the operation of a computer processor when loaded from the recording medium into the computer processor.

INDUSTRIAL APPLICABILITY

The present invention is applicable to applications such as an image comparison system which searches for an image of an object such as a human face from a database, and a program which implements the image comparison system on a computer.

The present invention is also applicable to applications such as search of an image of an object such as a human face existing on a network or on the Internet. Furthermore, the present invention can be suitably applied to applications such as determination of whether an image such as an identification photograph and a person holding it are the same.

The invention claimed is:

1. An image comparison system comprising:
means for inputting three-dimensional data of an object;
reference image storing means for storing a reference image of at least one reference object;
pose candidate deciding means for generating a plurality of pose candidates;
comparison image generating means for generating, for the reference image for the at least one object, a comparison image close to the reference image, said generating including projecting the three-dimensional data onto a two-dimensional image in accordance with each of the plurality of pose candidates to generate a plurality of comparison images and calculating, for each of the plurality of comparison images, the minimum distance between the comparison image and the reference image and selecting, as the comparison image close to the reference image, the comparison image having the smallest minimum distance;
reference correction coefficient storing means for storing a correction coefficient corresponding to the reference image;
image comparing means for determining one of a minimum distance value and a maximum similarity degree between the reference image and the generated comparison images; and
correcting means for correcting, based on the correction coefficient, one of the minimum distance value and the maximum similarity degree determined by the image comparing means,
wherein the image comparing means performs a comparison between the reference image and each of the generated comparison images on the basis of one of the minimum distance value and the maximum similarity degree corrected by the correcting means and, based on a result of the comparison, identifies whether a match exists between any of the generated comparison images and of the reference image.

2. The image comparison system of claim 1, wherein said image comparing means identifies whether a match exists based on a comparison between the minimum distance value between the reference image and the generated comparison image and a threshold value and a result of comparison between the maximum similarity degree between the reference image and the generated comparison image and a threshold value.

3. The image comparison system of claim 1,
wherein said reference image storing means stores a reference image for each of a plurality of objects,
wherein said comparison image generating means generates, for each of the reference images, a comparison image close to the reference image, and
said image comparing means comprises:
calculating means for calculating, for each of the reference images, one of a distance value and a similarity degree between the reference image and the generated comparison image close to the reference image;
selecting means for selecting, for each of the reference images, one of a minimum distance value which is a smallest distance value and a maximum similarity degree which is a largest similarity degree for each reference image; and
comparing means for outputting, as a comparison result, one of a reference image including a smallest minimum distance value which is a smallest one of minimum distance values and a reference image including a largest maximum similarity degree which is a largest one of maximum similarity degrees.

4. The image comparison system of claim 1, further comprising reference weighting coefficient storing means for storing a weighting coefficient corresponding to the reference image, said image comparing means comprising calculating means for calculating one of the distance value and the similarity degree between the reference image and the comparison image based on the weighting coefficient corresponding to the reference image.

5. The image comparison system of claim 1 further comprising:

standard three-dimensional reference point storing means for storing a standard three-dimensional reference point corresponding to a standard three-dimensional object model;

standard three-dimensional weighting coefficient storing means for storing a standard three-dimensional weighting coefficient;

three-dimensional reference point extracting means for extracting a three-dimensional reference point from the input three-dimensional data; and input weighting coefficient converting means for obtaining a coordinate correspondence of the standard three-dimensional weighting coefficient to the three-dimensional data based on the standard three-dimensional reference point and the three-dimensional reference point of the three-dimensional data, and converting the standard three-dimensional weighting coefficient into a two-dimensional weighting coefficient in accordance with the pose candidate, said image comparing means comprising calculating means for calculating one of the distance value and the similarity degree between the reference image and the comparison image based on the converted two-dimensional weighting coefficient.

6. The image comparison system of claim 1, further comprising:

representative three-dimensional object model storing means for storing representative ones of three-dimensional object models as representative three-dimensional object models;

group storing means for storing related information of the representative three-dimensional object models and reference images;

three-dimensional comparing means for comparing the input three-dimensional data with the representative three-dimensional object models, and selecting a representative three-dimensional object model similar to the three-dimensional data; and reference image selecting means for selecting a reference image corresponding to the selected representative three-dimensional object model by referring to the related information, wherein said image comparing means compares the selected reference image with the input three-dimensional data.

7. The image comparison system of claim 1, further comprising:

representative image storing means for storing representative ones of images as representative images;

group storing means for storing related information of the representative images and reference images;

representative image selecting means for comparing the input three-dimensional data with the representative images, and selecting a representative image similar to the three-dimensional data; and reference image selecting means for selecting a reference image corresponding to the selected representative image by referring to the related information, wherein said image comparing means compares the selected reference image with the input three-dimensional data.

8. The image comparison system of claim 1, wherein the correction coefficient is determined on the basis of at least one of a distance value and a similarity degree between a representative three-dimensional object model and the reference image.

9. An image comparison method for identifying a match of an object to a stored reference image of at least one object, comprising steps of:

inputting three-dimensional data of an object;

generating at least one pose candidate as a candidate for pose of the object;

generating, for the reference image of the at least one object, a comparison image close to the reference image, said generating including projecting the three-dimensional data onto a two-dimensional image in accordance with each of the plurality of pose candidates to generate a plurality of comparison images and calculating, for each of the plurality of comparison images, the minimum distance between the comparison image and the reference image and selecting, as the comparison image close to the reference image, the comparison image having the smallest minimum distance;

storing a correction coefficient corresponding to the reference image;

identifying whether a match exists between the generated comparison image and the reference image, said identifying including determining one of a minimum distance value and a maximum similarity degree between the reference image and the generated comparison images; and correcting, based on the correction coefficient, one of the minimum distance value and the maximum similarity degree determined by the identifying step, wherein the step of identifying whether a match exists includes performing a comparison between the reference image and each of the generated comparison images on the basis of one of the minimum distance value and the maximum similarity degree corrected by the correcting step and, based on a result of the comparison, identifying whether a match exists between any of the generated comparison images and of the reference image.

10. The image comparison method of claim 9, wherein the step of identifying whether a match exists includes performing one of a comparison between the minimum distance value between the reference image and the generated comparison image and a threshold value and a comparison between the maximum similarity degree between the reference image and the generated comparison image and a threshold value.

11. The image comparison method of claim 9, wherein the step of generating a comparison image comprises the step of generating a comparison image close to each reference image for each of a plurality of objects; and wherein the step of identifying whether a match exists comprises the steps of:

calculating, for each of the reference images, one of a distance value and a similarity degree between the reference image and the generated comparison image close to the reference image;

selecting, for each of the reference images, one of a minimum distance value which is a smallest distance value and a maximum similarity degree which is a largest similarity degree for each reference image; and outputting, as a comparison result, one of a reference image including a smallest minimum distance value which is a smallest one of minimum distance values and a reference image including a largest maximum similarity degree which is a largest one of maximum similarity degrees.

12. The image comparison method of claim 9, further comprising the step of correcting one of the minimum distance value and the maximum similarity degree based on a correction coefficient corresponding to the reference image.

13. The image comparison method of claim 9, wherein the step of identifying whether a match exists comprises the step of calculating one of the distance value and the similarity degree between the reference image and the comparison image based on a weighting coefficient corresponding to the reference image.

14. The image comparison method of claim 9, further comprising the steps of:

extracting a three-dimensional reference point from the input three-dimensional data; and obtaining a coordinate correspondence of a standard three-dimensional weighting coefficient to the three-dimensional data by using a standard three-dimensional reference point corresponding to a standard three-dimensional object model and the three-dimensional reference point of the three-dimensional data, and converting the standard three-dimensional weighting coefficient into a two-dimensional weighting coefficient in accordance with the pose candidate, wherein the step of identifying whether a match exists comprises the step of calculating one of the distance value and the similarity degree between the reference image and the comparison image based on the converted two-dimensional weighting coefficient.

15. The image comparison method of claim 9, further comprising the steps of:

comparing the input three-dimensional data with representative three-dimensional object models which are representative ones of three-dimensional object models, and selecting a representative three-dimensional object model similar to the three-dimensional data; and selecting a reference image corresponding to the selected representative three-dimensional object model by referring to information indicating relations between the representative three-dimensional object models and reference images, wherein the step of identifying whether a match exists comprises the step of comparing the selected reference image with the input three-dimensional data.

16. The image comparison method of claim 9, further comprising the step of:

comparing the input three-dimensional data with representative images which are representative ones of images, and selecting a representative image similar to the three-dimensional data; and selecting a reference image corresponding to the selected representative image by referring to information indicating relations between the representative images and reference images, wherein the step of identifying whether a match exists comprises the step of comparing the selected reference image with the input three-dimensional data.

17. The image comparison method of claim 12, further comprising the step of determining the correction coefficient on the basis of at least one of a distance value and a similarity degree between a representative three-dimensional object model and the reference image.

18. A computer readable medium storing a computer program that, when executed by a computer, causes the computer to execute:

a procedure of inputting three-dimensional data of an object;

a procedure of generating at least one pose candidate as a candidate for pose of the object;

a procedure of generating, for a reference image of at least one object, a comparison image close to the reference image, said generating including projecting the three-dimensional data onto a two-dimensional image in accordance with each of the plurality of pose candidates to generate a plurality of comparison images and calculating, for each of the plurality of comparison images, the minimum distance between the comparison image and the reference image and selecting, as the comparison image close to the reference image, the comparison image having the smallest minimum distance;

a procedure of storing a correction coefficient corresponding to the reference image;

a procedure of identifying whether a match exists between the generated comparison image and the reference image, said identifying including determining one of a minimum distance value and a maximum similarity degree between the reference image and the generated comparison images; and a procedure of correcting, based on the correction coefficient, one of the minimum distance value and the maximum similarity degree determined by the procedure of identifying whether a match exists, wherein the procedure of identifying whether a match exists includes a procedure of performing a comparison between the reference image and each of the generated comparison images on the basis of one of the minimum distance value and the maximum similarity degree corrected by the procedure of correcting and, based on a result of the comparison, identifying whether a match exists between any of the generated comparison images and of the reference image.

19. The computer readable storage medium of claim 18, wherein the computer program, when executed by the computer in the procedure of identifying whether a match exists causes the computer to execute:

a procedure of one of a comparison between the minimum distance value between the reference image and the generated comparison image and a threshold value and a comparison between the maximum similarity degree between the reference image and the generated comparison image and a threshold value.

20. The computer readable storage medium of claim 18, wherein the computer program, when executed by the computer in the procedure of generating a comparison image, causes the computer to execute a procedure of generating a comparison image close to each reference image for each of a plurality of objects, and in the procedure of identifying whether a match exists causes the computer to execute:

a procedure of calculating, for each of the reference images, one of a distance value and a similarity degree between the reference image and the generated comparison image close to the reference image;

a procedure of selecting, for each of the reference images, one of a minimum distance value which is a smallest distance value and a maximum similarity degree which is a largest similarity degree for each reference image; and a procedure of outputting, as a comparison result, one of a reference image including a smallest minimum distance value which is a smallest one of minimum distance values and a reference image including a largest maximum similarity degree which is a largest one of maximum similarity degrees.

21. The computer readable storage medium of claim 18, wherein the computer program, when executed by the computer further causes the computer to execute a procedure of correcting one of the minimum distance value and the maximum similarity degree based on a correction coefficient corresponding to the reference image.

22. The computer readable storage medium of claim 18, wherein the computer program, when executed by the computer in the procedure of identifying whether a match exists, performing comparison, the program causes the computer to execute a procedure of calculating one of the distance value and the similarity degree between the reference image and the comparison image by using a weighting coefficient corresponding to the reference image.

23. The computer readable storage medium of claim 18, wherein the computer program, when executed by the computer further causes the computer to execute:

a procedure of extracting a three-dimensional reference point from the input three-dimensional data; and a procedure of obtaining a coordinate correspondence of a standard three-dimensional weighting coefficient to the three-dimensional data by using a standard three-dimensional reference point corresponding to a standard three-dimensional object model and the three-dimensional reference point of the three-dimensional data, and converting the standard three-dimensional weighting coefficient into a two-dimensional weighting coefficient in accordance with the pose candidate, wherein in the procedure of performing comparison, the program causes the computer to execute a procedure of calculating one of the distance value and the similarity degree between the reference image and the comparison image by using the converted two-dimensional weighting coefficient.

24. The computer readable storage medium of claim 18, wherein the computer program, when executed by the computer further causes the computer to execute:

a procedure of comparing the input three-dimensional data with representative three-dimensional object models which are representative ones of three-dimensional object models, and selecting a representative three-dimensional object model similar to the three-dimensional data; and a procedure of selecting a reference image corresponding to the selected representative three-dimensional object model by referring to information indicating relations between the representative three-dimensional object models and reference images, wherein in the procedure of performing comparison, the program causes the computer to execute a procedure of comparing the selected reference image with the input three-dimensional data.

25. The computer readable storage medium of claim 18, wherein the computer program, when executed by the computer further causes the computer to execute:

a procedure of comparing the input three-dimensional data with representative images which are representative ones of images, and selecting a representative image similar to the three-dimensional data; and a procedure of selecting a reference image corresponding to the selected representative image by referring to information indicating relations between the representative images and reference images, wherein in the procedure of performing comparison, the program causes the computer to execute a procedure of comparing the selected reference image with the input three-dimensional data.

26. The computer readable storage medium of claim 21, wherein the computer program, when executed by the computer further causes the computer to execute a procedure of determining the correction coefficient on the basis of at least one of a distance value and a similarity degree between a representative three-dimensional object model and the reference image.

* * * * *